(12) United States Patent
Cohen et al.

(10) Patent No.: US 7,408,937 B1
(45) Date of Patent: Aug. 5, 2008

(54) METHODS AND APPARATUS FOR IDENTIFYING A VARIABLE NUMBER OF ITEMS FIRST IN SEQUENCE FROM A VARIABLE STARTING POSITION WHICH MAY BE PARTICULARLY USEFUL BY PACKET OR OTHER SCHEDULING MECHANISMS

(75) Inventors: Earl T. Cohen, Fremont, CA (US); Tony Lee Werner, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 989 days.

(21) Appl. No.: 10/338,985

(22) Filed: Jan. 9, 2003

(51) Int. Cl.
  *H04L 12/56* (2006.01)
(52) U.S. Cl. .................. 370/394; 370/419
(58) Field of Classification Search .......... 370/427
  See application file for complete search history.

(56) References Cited

U.S. PATENT DOCUMENTS

| | | | |
|---|---|---|---|
| 4,733,390 A | | 3/1988 | Shirakawa et al. |
| 5,500,858 A | | 3/1996 | McKeown |
| 5,526,352 A | * | 6/1996 | Min et al. ............ 370/395.4 |
| 5,729,702 A | | 3/1998 | Creedon et al. |
| 5,832,278 A | | 11/1998 | Pham |
| 5,923,644 A | | 7/1999 | McKeown et al. |
| 6,212,182 B1 | | 4/2001 | McKeown |
| 6,633,568 B1 | * | 10/2003 | Han et al. ............ 370/395.4 |
| 6,754,223 B1 | * | 6/2004 | Lussier et al. ............ 370/412 |
| 7,023,840 B2 | * | 4/2006 | Golla et al. ............ 370/360 |
| 7,145,904 B2 | * | 12/2006 | Zhao et al. ............ 370/371 |
| 2003/0193941 A1 | * | 10/2003 | Bonomi et al. ............ 370/389 |

OTHER PUBLICATIONS

Halsall (Data Communications, Computer Network and Open Systems, Fourth Edition, Addison-Wesley, 1998).*
Nick McKeown, *The iSlip Scheduling Algorithm for Input-Queued Switches*, IEEE/ACM Transactions on Networking, vol. 7, No. 2, Apr. 1999, pp. 188-201.
McKeown et al., *Tiny Tera: A Packet Switch Core*, IEEE Micro, vol. 17, Issue 1, Jan.-Feb. 1997, pp. 26-33.

(Continued)

*Primary Examiner*—Seema S. Rao
*Assistant Examiner*—Wanda Z Russell
(74) *Attorney, Agent, or Firm*—The Law Office of Kirk D. Williams

(57) ABSTRACT

Methods and apparatus are disclosed for identifying a variable number of items first in sequence from a variable starting position which may be particularly useful by packet or other scheduling mechanisms, such as, but not limited to the SLIP/I SLIP scheduling algorithms or variants thereof. Each of the groups of items is typically identified with a number of items the group desires to be selected. Based on an identified starting position, a progressive sum value is initialized, with progressive sum values corresponding to successive groups of items in the sequence being adjusted typically based on the corresponding number of items each successive group desires to be selected. The number of items a particular group is authorized to select can then be determined, such as, but not limited to, by being based on its corresponding progressive sum value, the progressive sum value of the immediately prior group in the sequence, and its desired number of items to be selected.

32 Claims, 31 Drawing Sheets

OTHER PUBLICATIONS

Nick McKeown and Thomas E. Anderson, *A Quantitative Comparison of Scheduling Algorithms for Input-Queued Switches*, Computer Networks and ISDN Systems, vol. 30, No. 24, pp. 2309-2326, Dec. 1998.

Pankaj Gupta and Nick McKeown, *Designing and Implementing a Fast Crossbar Scheduler*, IEEE Micro, vol. 19, Issue 1, Jan.-Feb. 1999, pp. 20-28.

* cited by examiner

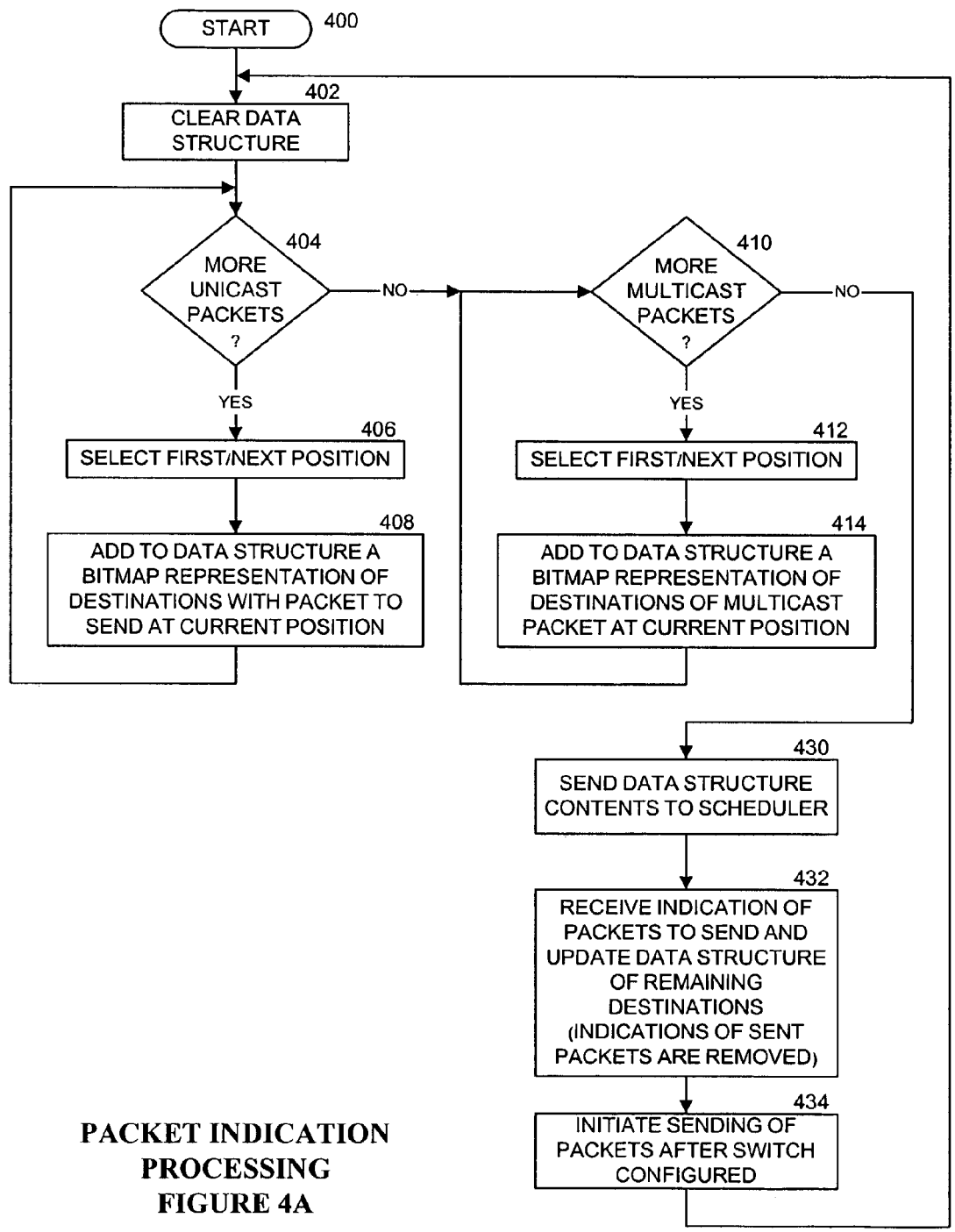

GENERATE REQUESTS

GRANT PROCESSING

ACCEPTANCE PROCESSING

MULTICAST POINTER PROCESSING

METHODS AND APPARATUS FOR IDENTIFYING A VARIABLE NUMBER OF ITEMS FIRST IN SEQUENCE FROM A VARIABLE STARTING POSITION WHICH MAY BE PARTICULARLY USEFUL BY PACKET OR OTHER SCHEDULING MECHANISMS

FIELD OF THE INVENTION

This invention especially relates to communications and computer systems; and more particularly, the invention relates to identifying a variable number of items first in sequence from a variable starting position which may be particularly useful by packet or other scheduling mechanisms.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

SLIP is an iterative algorithm for scheduling the sending of packets across an N×N switch. In one implementation, the following three steps are performed:

1. Each unmatched input sends a request to every output for which it has a queued cell.
2. If an unmatched output receives any requests, it chooses the one that appears next in a fixed, round-robin schedule starting from the highest selection priority element. The output notifies each input whether or not its request was granted. The pointer to the highest selection priority element of the round-robin schedule is incremented (modulo N) to one location beyond the granted input if and only if the grant is accepted in step 3 of the first iteration. The pointer is not incremented in subsequent iterations.
3. If an input receives a grant, it accepts the one that appears next in a fixed, round-robin schedule starting from the highest selection priority element. The pointer to the highest selection priority element of the round-robin schedule is incremented (modulo N) to one location beyond the accepted output.

I-SLIP is a scheduling algorithm including multiple iterations of the SLIP algorithm to determine the scheduling of packets for each round of sending packets (rather than just one SLIP iteration.)

Each output scheduler decides among the set of ordered, competing requests using a rotating selection priority. When a requesting input is granted and the input accepts that grant, the input will have the lowest selection priority at that output in the next cell time. Also, whatever input has the highest selection priority at an output will continue to be granted during each successive time slot until it is serviced. This ensures that a connection will not be starved: the highest selection priority connection at an output will always be accepted by an input in no more than N cell times.

Moving the pointers not only prevents starvation, it tends to desynchronize the schedulers. Each of the outputs that matched in the previous time slot will have a different highest selection priority input. Thus, they will each grant to different inputs. Consider an example in which two inputs are both requesting the same two outputs. Initially, both outputs may grant to the same input; in that case only one connection will be made in the first iteration.

The successful output will increment its pointer and in the next cell time, the outputs will no longer contend: one will have moved on to grant to another input and the other will grant to the same input as before. This leads to a better match in the first iteration of the next cell time. This is because the output schedulers have become desynchronized (or "slipped") with respect to each other. This leads to high performance, even for a single iteration of SLIP.

Because of the round-robin movement of the pointers, the algorithm tends to provide a fair allocation of bandwidth among competing connections and to be burst-reducing. The burst-reduction is simplest to understand under high load when all input queues are occupied: the algorithm will visit each competing connection in turn, so that even if a burst of cells for the same output arrives at the input, the burst will be spread out in time if there is competing traffic.

An example implementation is described in Nicholas W. McKeown, "Method and Apparatus for Scheduling Cells in an Input-Queued Switch, U.S. Pat. No. 5,500,858, issued Mar. 19, 1996, which is hereby incorporated by reference. Another example implementation is described in Nicholas W. McKeown, "Combined Unicast and Multicast Scheduling," U.S. Pat. No. 6,212,182, issued Apr. 3, 2001, which is hereby incorporated by reference.

The operation to find the first n elements from a starting position is a key component of many scheduling and other mechanisms. For example, the highest priority element (i.e., the starting position), beginning from which to select a next known number of elements, changes during the operation of a scheduling mechanism based on I-SLIP, and the number of elements to select remains the same or decreases for a subsequent I-SLIP iteration. These varying positions and values typically complicate the find first n operation. Moreover, the rate at which these next n elements are identified affects the performance of the scheduler, and therefore it is important to quickly and efficiently identify these next n elements. Needed are new methods and apparatus for finding a first n elements for a possibly varying value of n and possibly from a variable starting position.

SUMMARY OF THE INVENTION

Methods and apparatus are disclosed for identifying a variable number of items first in sequence from a variable starting position which may be particularly useful by packet or other scheduling mechanisms, such as, but not limited to the SLIP/I-SLIP scheduling algorithms or variants thereof. Each of the groups of items is typically identified with a number of items the group desires to be selected (e.g., for scheduling, sending, processing, etc.). Based on an identified starting position, which varies according to some method or mechanism, a progressive sum value is initialized, with progressive sum values corresponding to successive groups of items in the sequence being adjusted typically based on the corresponding number of items each successive group desires to be selected. The number of items a particular group is authorized to select can then be determined, such as, but not limited to, by being based on its corresponding progressive sum value, the progressive sum value of the immediately prior group in the sequence, and its desired number of items to be selected.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 4A and 4C are flow diagrams of processes used in one embodiment for communicating unicast and multicast packet indications to a scheduler;

DETAILED DESCRIPTION

Figure 1A:
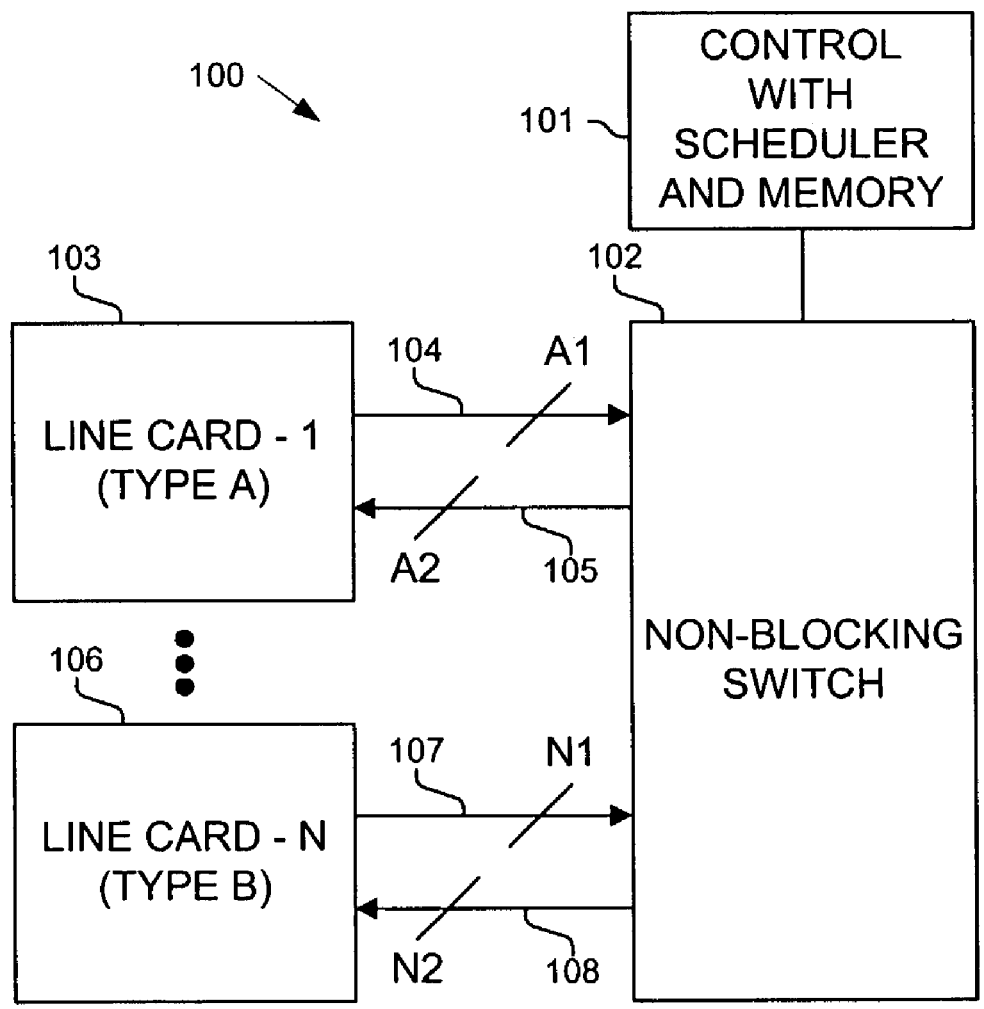
FIGS. 1A-E are block diagrams of embodiments scheduling packets in a system having a non-blocking switching fabric.

Methods and apparatus are disclosed for identifying a variable number of items first in sequence from a variable starting position which may be particularly useful by packet or other scheduling mechanisms, such as, but not limited to the SLIP/I-SLIP scheduling algorithms or variants thereof. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet contents (e.g., packet header or other fields), and such steps or action may or may not include modifying and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. Moreover, the term "or" is used herein to identify a selection of one or more, including all, of the conjunctive items.

Methods and apparatus are disclosed for identifying a variable number of items first in sequence from a variable starting position which may be particularly useful by packet or other scheduling mechanisms, such as, but not limited to the SLIP/I-SLIP scheduling algorithms or variants thereof. Each of the groups of items is typically identified with a number of items the group desires to be selected (e.g., for scheduling, sending, processing, etc.). Based on an identified starting position, which varies according to some method or mechanism, a progressive sum value is initialized, with progressive sum values corresponding to successive groups of items in the sequence being adjusted typically based on the corresponding number of items each successive group desires to be selected. The number of items a particular group is authorized to select can then be determined, such as, but not limited to, by being based on its corresponding progressive sum value, the progressive sum value of the immediately prior group in the sequence, and its desired number of items to be selected.

Additionally, methods and apparatus are disclosed for scheduling packets in systems, such as, but not limited to systems having a non-blocking switching fabric and homogeneous or heterogeneous line card interfaces. In one embodiment, multiple request generators, grant arbiters, and acceptance arbiters work in conjunction to determine this scheduling. A set of requests for sending packets from a particular input is generated. From a grant starting position, a first n requests in a predetermined sequence are identified, where n is less than or equal to the maximum number of connections that can be used in a single packet time to the particular output. The grant starting position is updated in response to the first n grants including a particular grant corresponding to a grant advancement position. In one embodiment, the set of grants generated based on the set of requests is similarly determined using an acceptance starting position and an acceptance advancement position.

In one embodiment, a "packet time" is a time interval for a given switch configuration during which one or more packets can be sent from one or more inputs to one or more outputs. In one embodiment, the packet time corresponds to the scheduling time interval required or allocated to perform the scheduling of packets, and thus, packets can be sent while the packet scheduling and corresponding switch configuration are being determined for the next packet time.

FIG. 1 illustrates one embodiment of a system 100 including a non-blocking switch (or switch fabric) 102, a control with scheduler and memory 101, and multiple line cards 103-106. Line card 103 is denoted as being of "type A" with A1 ingress links or ports 104 and A2 egress links or ports 105. Line card 106 is denoted as being of "type B" with N1 ingress links or ports 107 and N2 egress links or ports 108. This labeling emphasizes that interfaces and line cards with varying rates and numbers of ports or connections to a non-blocking switch 102 are supported.

Figure 1B:
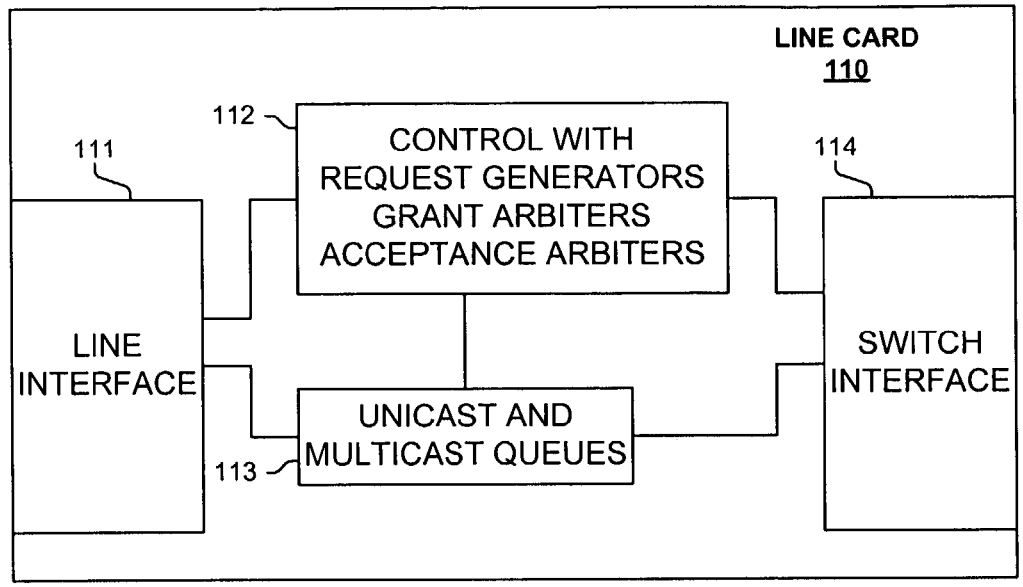

FIG. 1B illustrates one embodiment of a line card 110. Signals including packets or other data formats are received and transmitted by line interface 111. Shown are unicast and multicast queues 113, wherein incoming packets to be scheduled are placed in one embodiment. Control with request generators, grant arbiters, and acceptance arbiters 112 determines and schedules packets as described hereinafter, with packets being sent from unicast and multicast queues 113 at their respective scheduled times via switch interface 114. Additionally, scheduling requests, grants, and acceptances are communicated among other request generators, grant arbiters, and acceptance arbiters via switch interface 114.

Figure 1C:
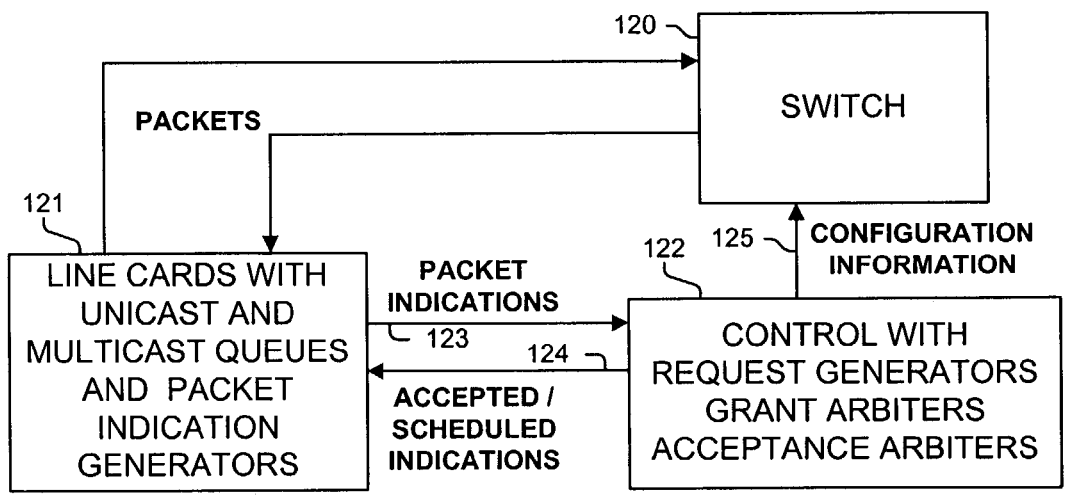

FIG. 1C illustrates one embodiment wherein the request generators, grant arbiters, and acceptance arbiters are centrally located in control with request generators, grant arbiters and acceptance arbiters 122. Line cards with unicast and multicast queues and packet indication generators 121 send packet traffic indications 123 to control with request generators, grant arbiters and acceptance arbiters 122. Returned are accepted/scheduled indications 124 of packets to line cards 121, which initiate the sending of the accepted packets at the scheduled time. Additionally, control with request generators, grant arbiters and acceptance arbiters 122 sends configuration information 125 to switch 120, so the switching fabric can be configured to communicate the accepted packets between the switch input and output ports and connected line cards 121.

Figure 1D:
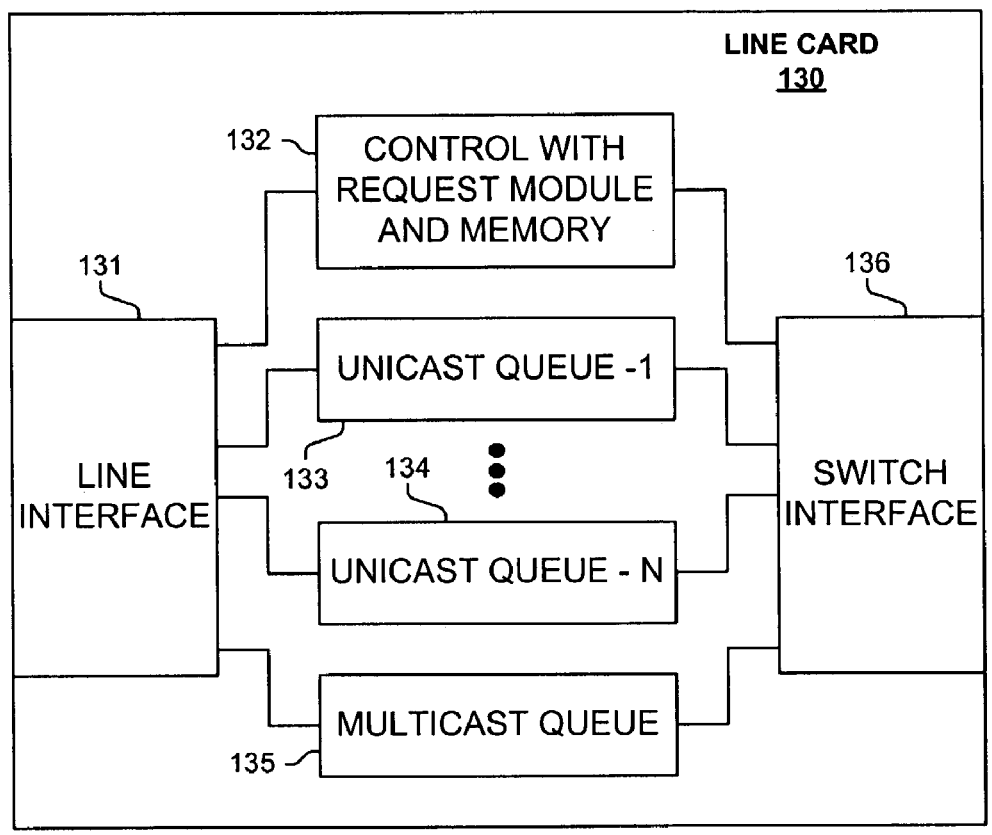

FIG. 1D illustrates one embodiment of a line card 130. Signals including packets or other data formats are received and transmitted by line interface 131. Shown are N unicast queues 133-134 and one multicast queue 135, wherein incoming packets to be scheduled are placed. Typically, N corresponds to the number of output line cards or the number of switch output ports to which the line card can send packets. In one embodiment, additional queues are used, such as, but not limited to multiple multicast queues and queues for buffering packets having various priority levels. Control with request module and memory 132 sends packet indications and receives accepted and scheduled indications via switch interface 136.

Figure 1E:
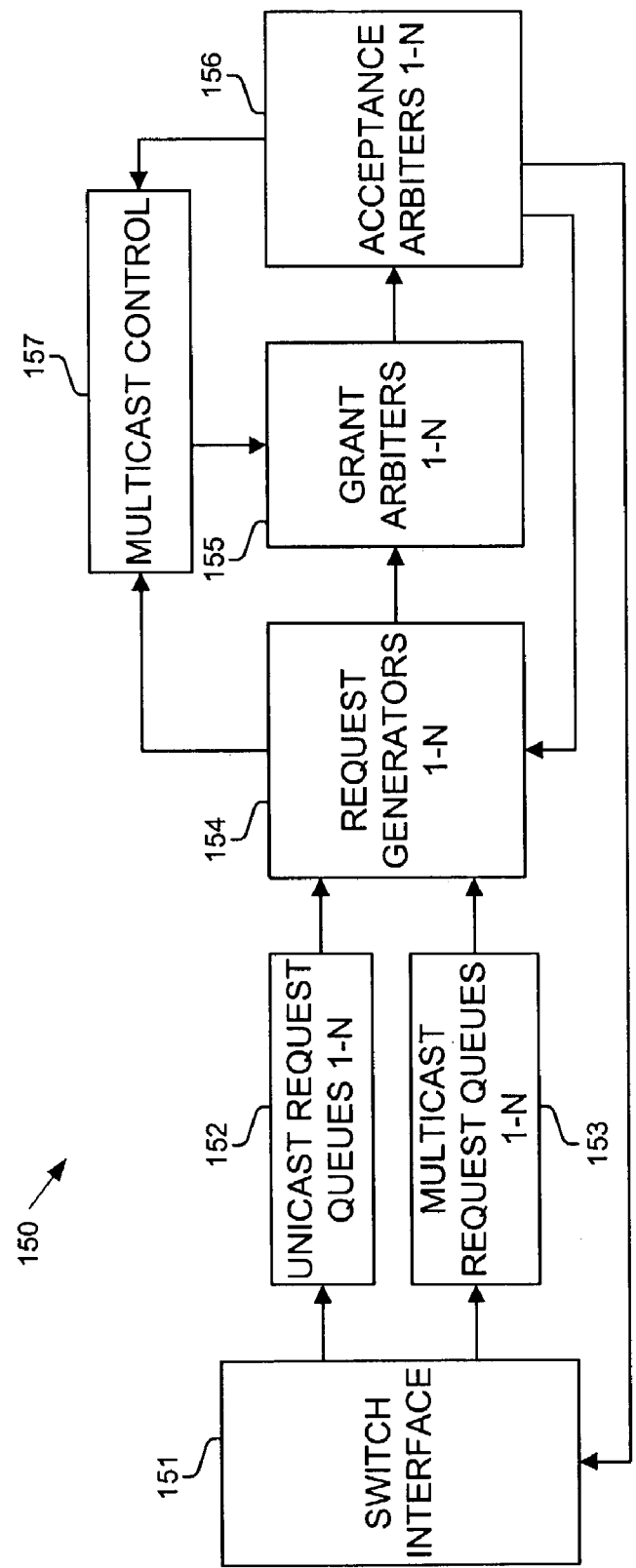

FIG. 1E illustrates a system 150 including a N request generators 154, grant arbiters 155, and acceptance arbiters 156. Packet indications are received from various line cards via switch interface 151 and stored in the corresponding queue of the N unicast queues 152 and N multicast request queues 153. The N request generators 154, based on the packet indications in queues 152 and 153, generate unicast and multicast packet requests (typically in separate iterations) and communicate to the N grant arbiters 155 corresponding to the destination of the packets. The N grant arbiters 155 in turn generate and communicate their grants to the N acceptance arbiters 156 corresponding to the source of the granted packets. The acceptances are then, or after multiple iterations, communicated to switch interface 151 for relaying to the appropriate line cards and switch configuration control. In one embodiment, a multicast control 157 is used maintain a common multicast position used by grant arbiters 155 in selecting which multicast requests to grant.

Figure 2:
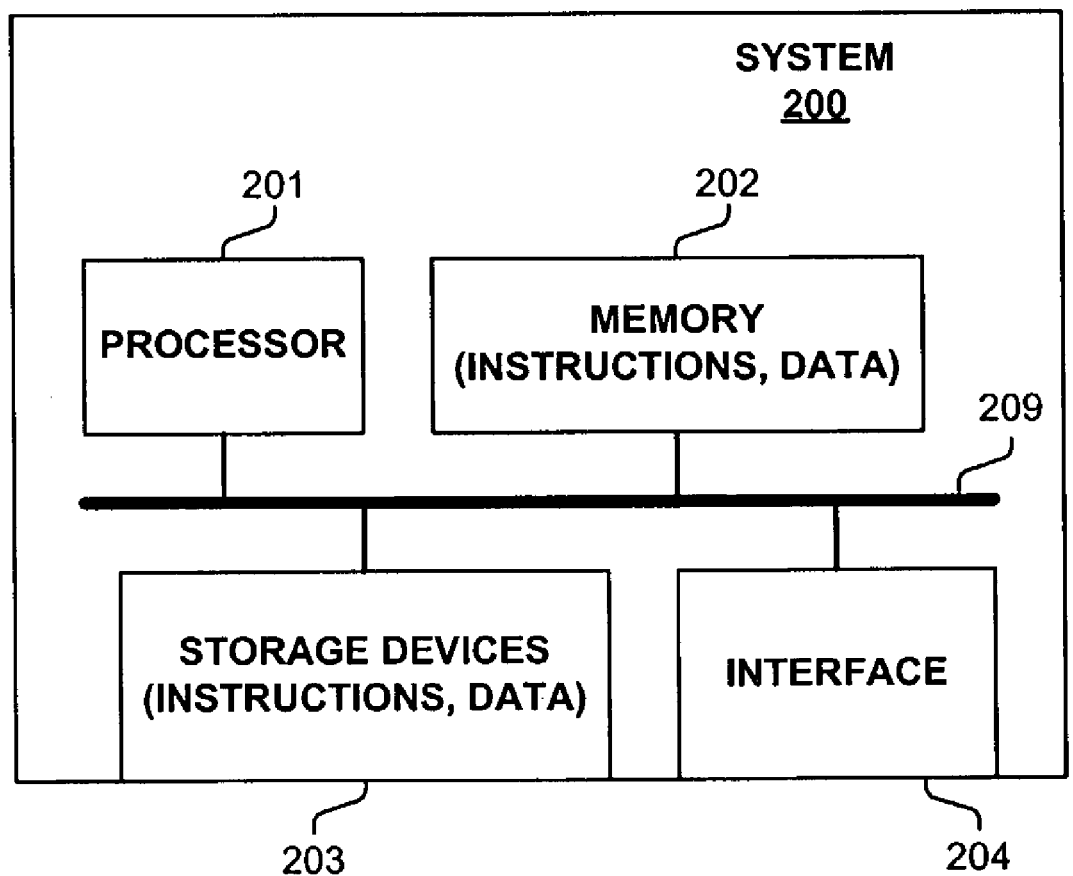
FIG. 2 is a block diagram of a system which may be used in one or more embodiments of the invention.

FIG. 2 illustrates one embodiment of a system 200, which may include, but is not limited to one or more request generators, grant arbiters and/or acceptance arbiters for scheduling packets and/or identifying a variable number of items first in sequence from a variable starting position according to the invention. In one embodiment, system 200 includes a processor 201, memory 202, storage devices 203, and switch/control interface 204, which are typically coupled via one or more communications mechanisms 209 (shown as a bus for illustrative purposes.) Various embodiments of system 200 may include more or less elements. The operation of system 200 is typically controlled by processor 201 using memory 202 and storage devices 203 to perform one or more scheduling tasks or processes. Memory 202 is one type of computer-readable medium, and typically comprises random access memory (RAM), read only memory (ROM), flash memory, integrated circuits, and/or other memory components. Memory 202 typically stores computer-executable instructions to be executed by processor 201 and/or data which is manipulated by processor 201 for implementing functionality in accordance with the invention. Storage devices 203 are another type of computer-readable medium, and typically comprise solid state storage media, disk drives, diskettes, networked services, tape drives, and other storage devices. Storage devices 203 typically store computer-executable instructions to be executed by processor 201 and/or data which is manipulated by processor 201 for implementing functionality in accordance with the invention.

Figure 3A:
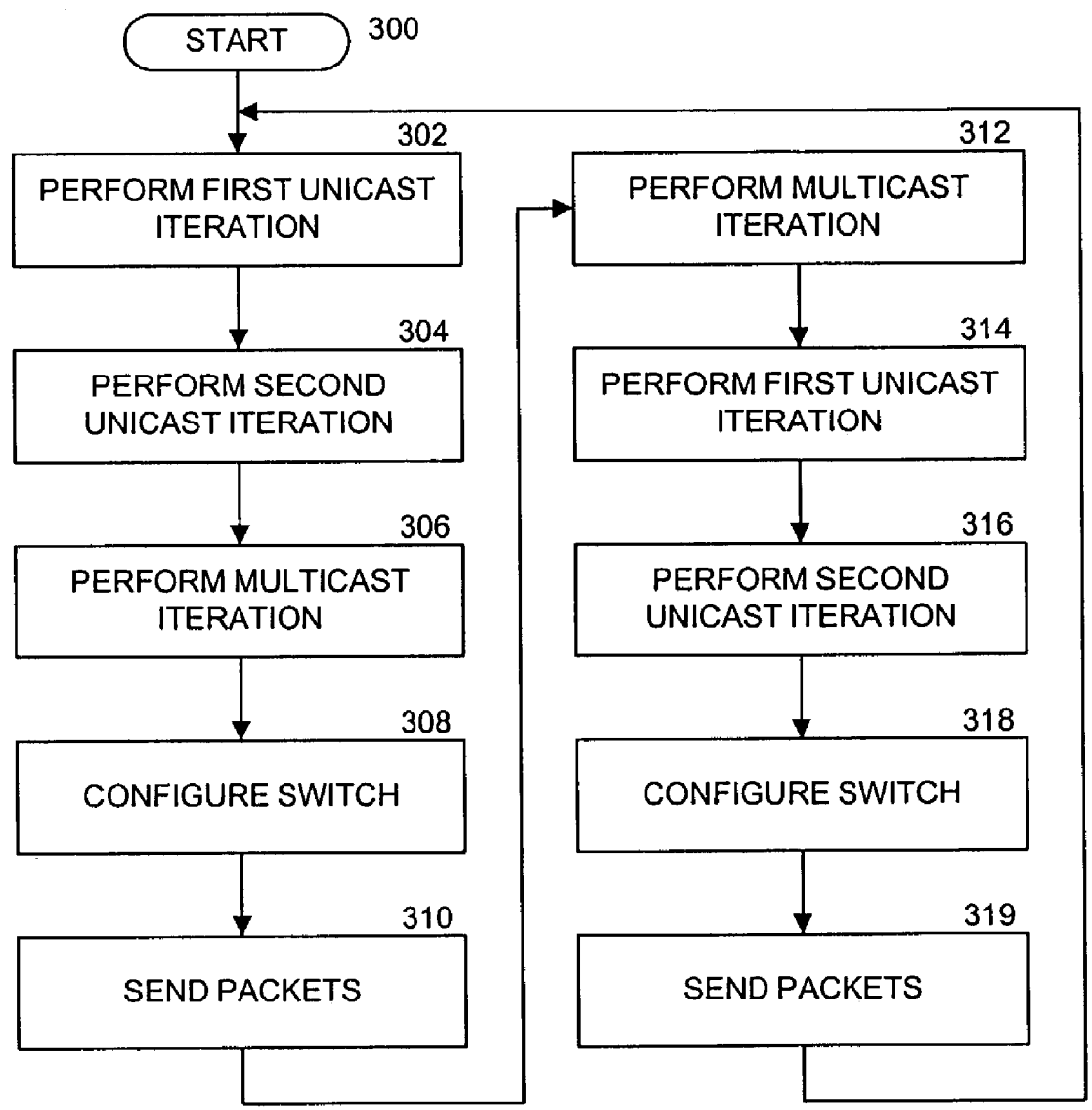
FIG. 3A is a flow diagram of a process used in one embodiment for scheduling unicast and multicast packets in three iteration scheduling cycles.

FIG. 3A illustrates a process used in one embodiment for scheduling packets using three scheduling iterations. Processing begins in process block 300, and proceeds to process block 302, wherein a first unicast scheduling iteration is performed. Next, in process block 304, a second unicast scheduling iteration is performed. In process block 306, a multicast scheduling iteration is performed. Next, in process block 308, the switch (and its switching fabric) are configured according to the scheduled packets, and in process block 310, the packets are sent. For the next scheduling round, processing proceeds to process block 312, wherein a multicast scheduling iteration is performed. Next, in process block 314, a first unicast scheduling iteration is performed. In process block 316, a second unicast scheduling iteration is performed. Next, in process block 318, the switch (and its switching fabric) are configured according to the scheduled packets, and in process block 319, the packets are sent. Processing returns to process block 302 to perform more scheduling of packets.

Figure 3B:
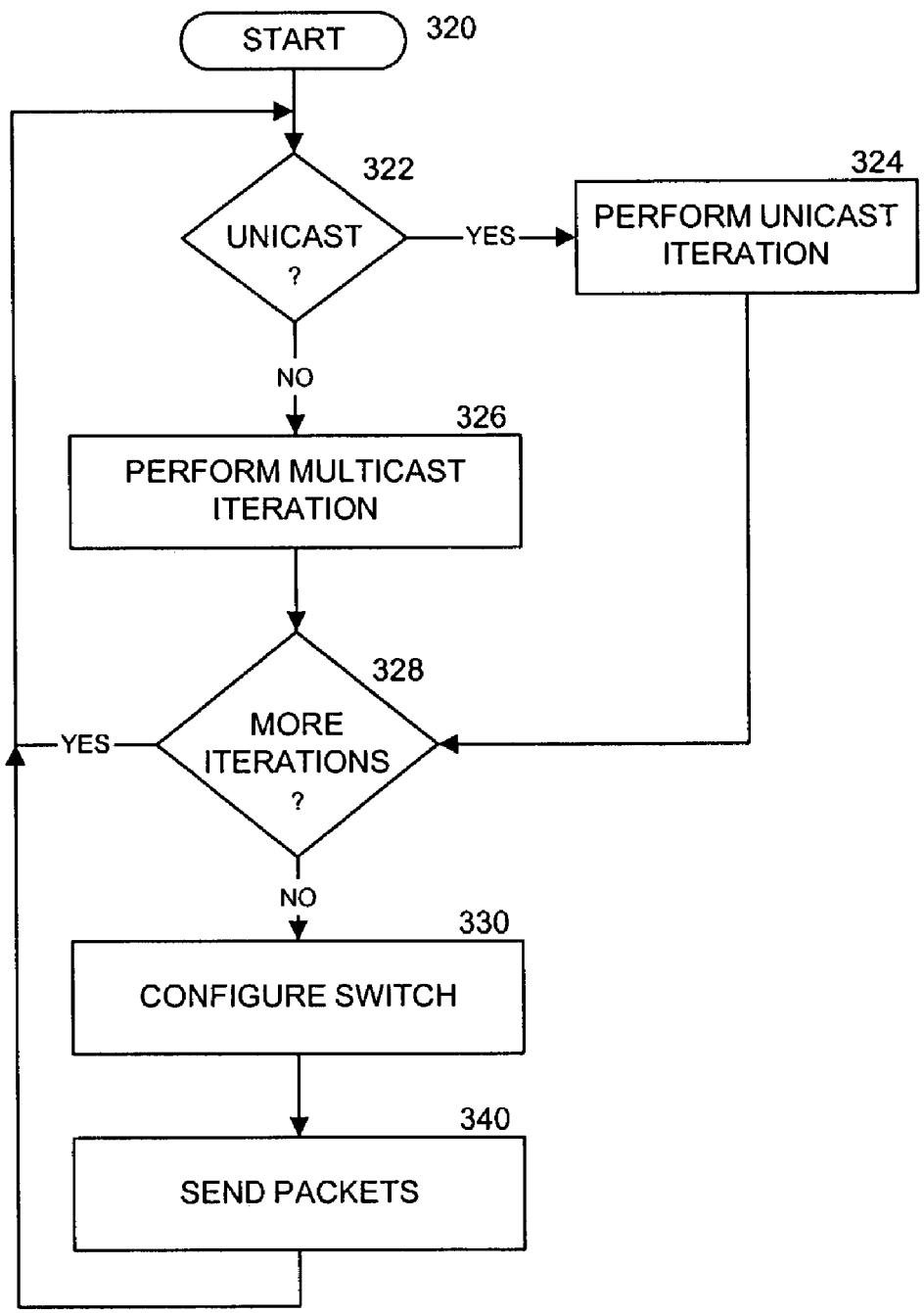
FIG. 3B is a flow diagram of a process used in one embodiment for scheduling unicast and/or multicast packets in one or more iterations.

FIG. 3B illustrates a process used in one embodiment for scheduling packets using one or more scheduling iterations, including unicast and/or multicast iterations in any desired order. Processing begins with process block 320. As determined in process block 322, if a unicast iteration is next, then in process block 324, the unicast scheduling iteration is performed; otherwise, a multicast scheduling iteration is performed in process block 326. As determined in process block 328, if there are more scheduling iterations to be performed for this scheduling cycle, then processing returns to process block 322 to perform the next scheduling iteration. Otherwise, the switch is configured in process block 330, packets are sent in process block 340, and processing then returns to process block 322.

FIG. 4A illustrates a process used in one embodiment to generate packet indication messages. Processing begins with process block 400, and proceeds to process block 402, wherein a packet indication data structure is cleared. As determined in process block 404, if there are more unicast packets to be sent, then a first or next position in the unicast queues is selected in process block 406. In process block 408, a bitmap or other representation of the destination or destinations of the packets at the selected position in the destination queues is added to the data structure, and processing returns to process block 404. In one embodiment for unicast and/or multicast packets, if a particular destination is disabled, out of service, or currently unreachable based on backpressure or other flow control information, indications for this destination are not added to the data structure in process blocks 408 or 414.

Otherwise, as determined in process block 410, if there are more multicast packets to be sent, then a first or next position in the multicast queue is selected in process block 412. In process block 414, a bitmap or other representation of the destinations of the multicast packet at the selected position in the multicast queue is added to the data structure, and processing returns to process block 410.

Otherwise, the data structure is sent to the scheduler in process block 430. In process block 432, indications are received from the scheduler of which packets to send and the multicast queues are updated if less than all destinations of a particular packet are allowed. The sending of these packets is initiated in process block 434. Processing returns to process block 402.

Figure 4B:
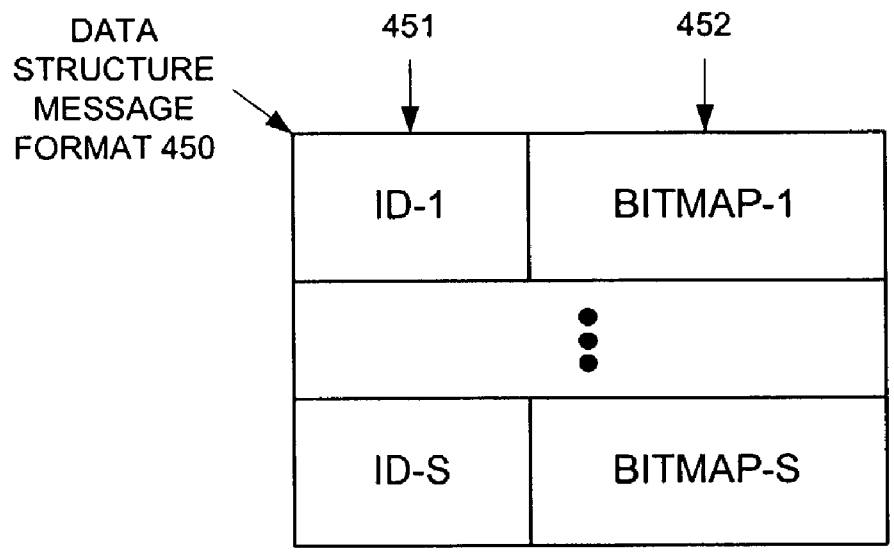
FIG. 4B is a block diagram of a message format used in one embodiment for communicating unicast and multicast packet indications to a scheduler.

FIG. 4B illustrates a block diagram of a data structure/message format 450 used in one embodiment. Data structure 450 typically has multiple entries, each with an identification field 451 to indicate whether the entry corresponds to unicast or multicast packet indications, and a bitmap field 452 to indicate the destinations of the packets.

Figure 4C:
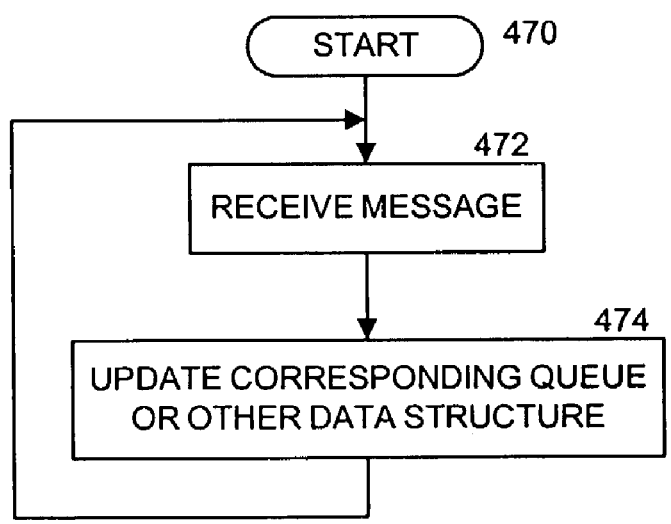

FIG. 4C illustrates a process used in one embodiment by a centralized scheduling system to collect the packet indications for the various sending line cards. Processing begins with process block 470, and proceeds to process block 472, wherein a message is received. In process block 474, one or more packet indication queues or other data structures are updated, and processing returns to process block 472.

Figure 5:
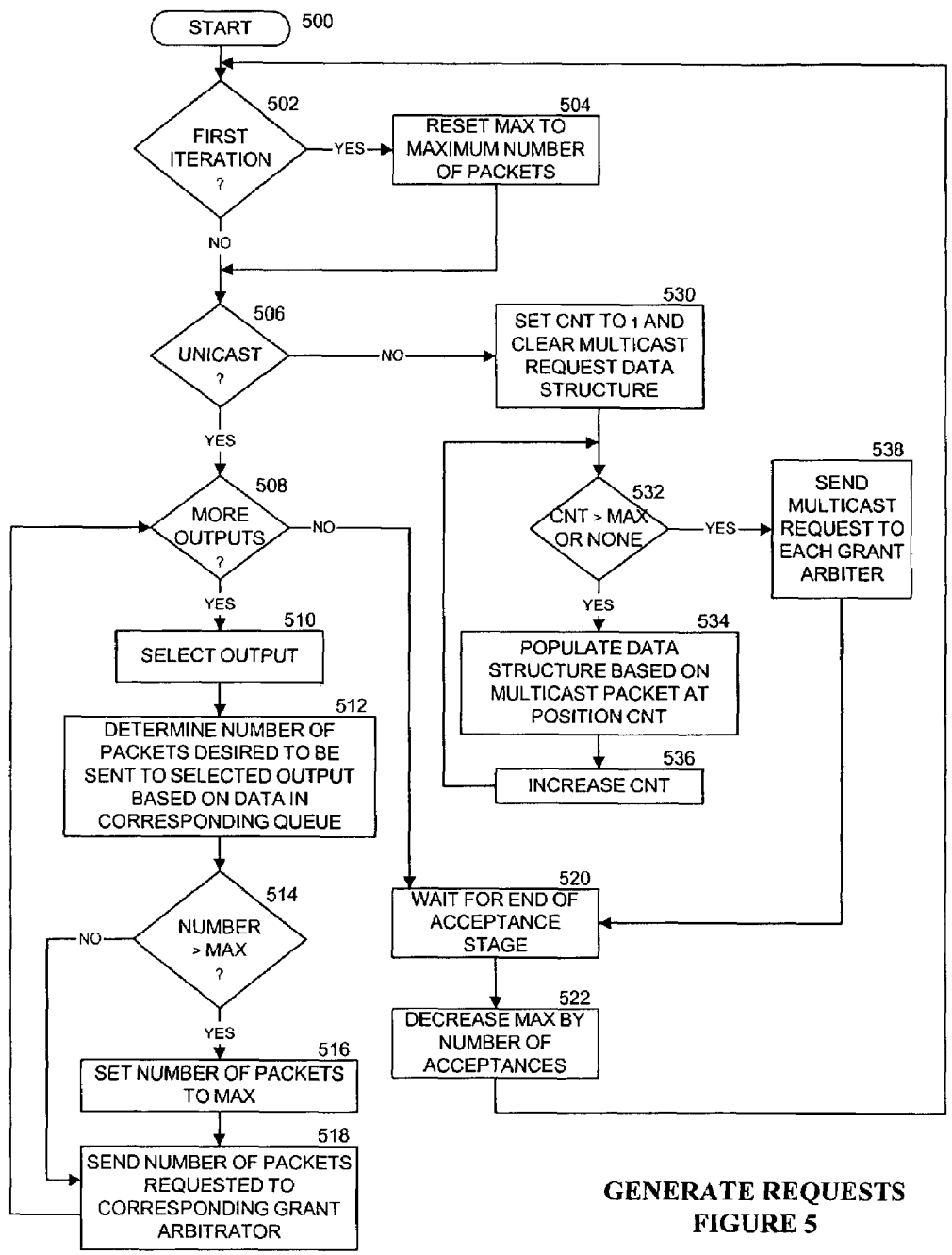
FIG. 5 is a flow diagram of a process used in one embodiment for generating requests.

FIG. 5 illustrates a process used in one embodiment by each of the request generators, typically one for each line card associated with the non-blocking packet switch. Processing begins with process block 500. As determined in process block 502, if this is a first iteration, then in process block 504, the value of MAX is set to the maximum number of packets that can be sent by the line card in a packet time, which typically corresponds to the number of switch input ports to which the line card connects. Each request generator will typically have outstanding a cumulative number of requests that it can service in a scheduling cycle.

As determined in process block 506, if this is a unicast iteration, then processing proceeds to process block 508 to indicate a set of requests to each of the grant arbiters. While there are more outputs as determined in process block 508, an output is selected in process block 510, and the number of desired packets to be sent to the particular output (up to the maximum number of packets the destination can actually receive in a packet time) is determined in process block 512. If this number is greater than the value of MAX as determined in process block 514, then this number is set to MAX in process block 516. In process block 518, the requests are signaled to the corresponding grant arbiter. After all outputs have been processed, then in process block 520, the request arbiter waits for the end of the acceptance stage of the current unicast iteration. Then, in process block 522, MAX is decreased by the number of acceptances corresponding to the previously sent requests from this request arbiter in this iteration, and processing returns to process block 502.

If, as determined in process block 506, that this is a multicast iteration, then processing proceeds to process block 530 to set CNT to one and to clear the multicast request data structure. While CNT is not greater than MAX and there are multicast requests to process as determined in process block 532, processing blocks 534 and 536 are performed. In process block 534, a data structure is populated based on the destinations of the multicast packet at position CNT in the multicast queue, and CNT is increased by one in process block 536. When done, processing proceeds to process block 538 to send a multicast request to each grant arbiter (of course, it could be a request of no multicast packets) or at least those grant arbiters with a pending multicast request from this request generator. Processing then proceeds to process block 520.

Figure 6A:
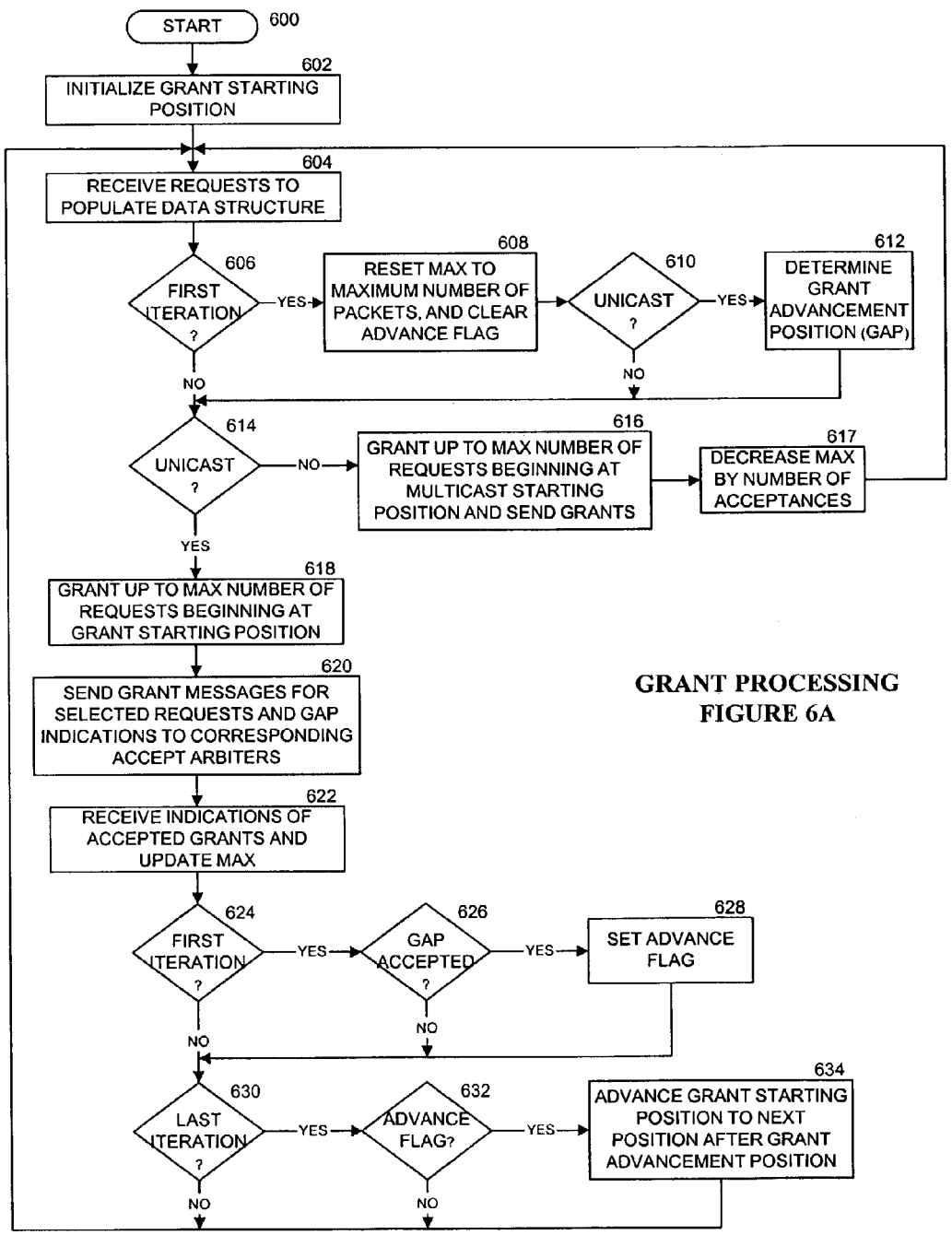
FIG. 6A is a flow diagram of a process used in one embodiment in performing grant processing.
Figure 6B:
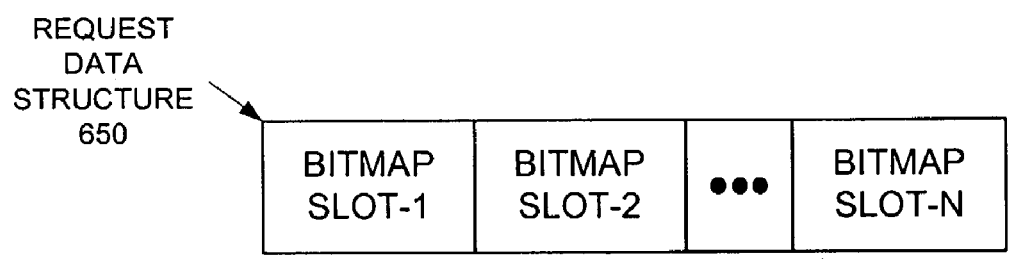
FIGS. 6B-C are block diagrams of data structures used in one embodiment in performing grant processing.

FIG. 6A illustrates a flow diagram of a process used by a grant arbiter in one embodiment. Processing begins with process block 600, and proceeds to process block 602, wherein a grant starting position is initialized. Next, in process block 604, the requests are received from the request generators, with these requests used to populate a data structure. In one embodiment, data structure 650 illustrated in FIG. 6B is used, with data structure 650 including a bitmap unary representation of the number of requests received for each slot (e.g., from each request generator).

In one embodiment, these bitmap representations are right-aligned as illustrated in data structure 660. In one embodiment, these bitmap representations are left-aligned, while in one embodiment, these bitmap representations are maintained in a manner representative of the physical ports of the line card or slot. The alignment of the requesting bits within such a bitmap typically impacts packet scheduling by affecting the updating of the grant starting position. When the bitmap is right-aligned, the starting position for selecting bits (e.g., bits corresponding to grants or acceptances) is more likely to advance to bits corresponding to a next line card or slot. However, this rate of advancement is still throttled by, inter alia, the traffic rate of the line card and switch throughput as indicated by the generation rate of requests, grants, and acceptances, as well as the line cards and ports corresponding to the particular requests, grants, and acceptances.

Returning to the processing of FIG. 6A, as determined in process block 606, if this is a first iteration of the current scheduling round, then in process block 608, MAX is set to the maximum number of packets which can be received in one packet time by the line card corresponding to this grant arbiter, and the advance flag is cleared. Next, as determined in process block 610, if this is a unicast iteration, then in process block 612, the grant advancement position (GAP) is determined. If a grant corresponding to the grant advancement position is accepted during the first iteration (or in any iteration in one embodiment), then the grant starting position will be modified so grants will be generated starting from a different position in a next scheduling round.

Figure 6C:
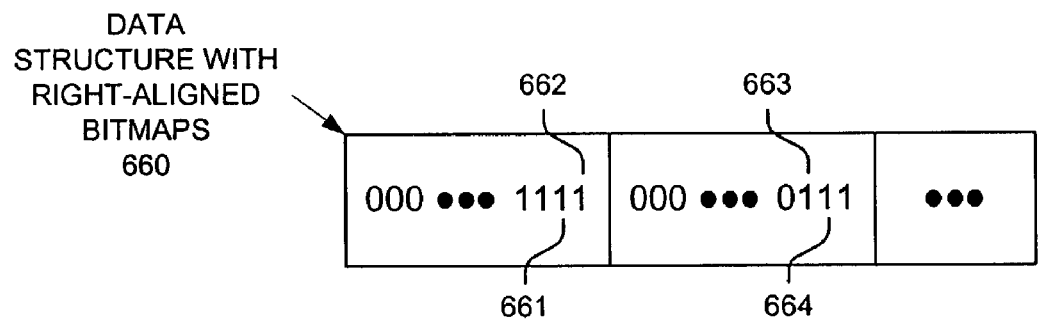

In one embodiment, the grant advancement position is the first position in the request data structure indicating a request after the grant starting position. Referring back to FIG. 6C, data structure 660 illustrates two right-aligned bitmaps. If the grant starting position is at position 661, then the grant advancement position is at position 662. If the grant starting position is at position 662, then the grant advancement position is at position 663. If the grant starting position is at position 663, then the grant advancement position is at position 664.

Returning to the processing of FIG. 6A and process block 614, if the iteration is not a unicast iteration, then in process block 616, up to MAX multicast grants are generated beginning at the multicast pointer position (common among all grant arbiters in one embodiment), and these grants are sent to the corresponding acceptance arbiters. In one embodiment, a mechanism for identifying a variable number of items first in sequence from a variable starting position described in relation to at least one of FIGS. 11A-B, 12A-B, 13A-B, 14, 15A-C and/or 16A-C is used to identify which multicast requests are granted; while in one embodiment, another mechanism is used to identify which multicast requests are granted. Next, in process block 617, the value of MAX is decreased by the number of acceptances, and processing returns to process block 604.

Otherwise, in process block 618, up to MAX unicast grants are generated beginning at the grant starting position. In one embodiment, a mechanism for identifying a variable number of items first in sequence from a variable starting position described in relation to at least one of FIGS. 11A-B, 12A-B, 13A-B, 14, 15A-C and/or 16A-C is used to identify which unicast requests are granted; while in one embodiment, another mechanism is used to identify which unicast requests are granted.

Next, in process block 620, these generated grants, along with an indication of whether a grant at the grant advancement position is included, are sent to the corresponding acceptance arbiters. Next, in process block 622, indications of the accepted grants are received, and MAX is decreased by the number of accepted grants generated by this grant arbiter. If, as determined in process block 624, this is a first iteration of the current scheduling cycle, then as determined in process block 626, if the packet at the grant advancement position was accepted, then the advance flag is set in process block 628. As determined in process block 630, if this is a last iteration of the current scheduling cycle, then as determined in process block 632, if the advance flag is set, then in process block 634, the grant starting position is advanced to the next position after the grant advancement position. Processing then returns to process block 604.

Figure 7A:
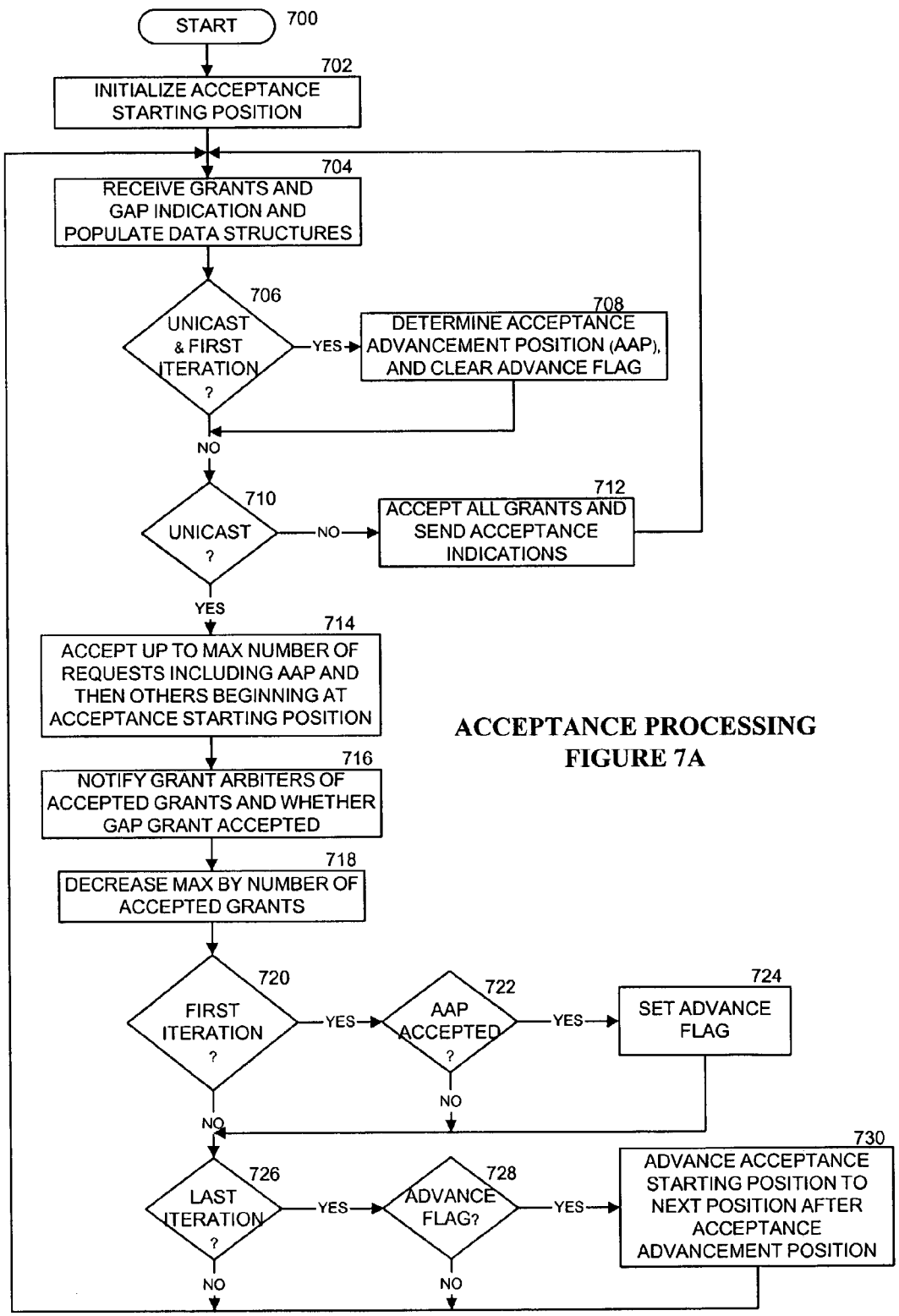
FIG. 7A is a flow diagram of a process used in one embodiment for performing acceptance processing.
Figure 7B:
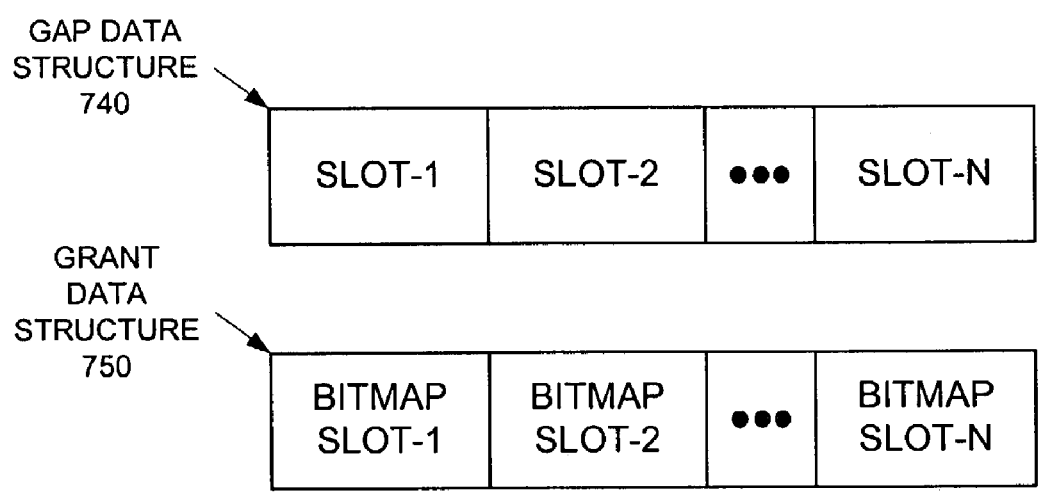
FIG. 7B illustrates block diagrams of data structures used in one embodiment for performing acceptance processing.

FIG. 7A illustrates a flow diagram of a process used by an acceptance arbiter in one embodiment. Processing begins with process block 700, and proceeds to process block 702, wherein an acceptance starting position is initialized. Next, in process block 704, the grants and grant advancement position indicators are received from the grant arbiters, with this data being used to populate one or more data structures. In one embodiment, GAP data structure 740 illustrated in FIG. 7B is used to maintain the grant acceptance indications for each of the grant arbiters (corresponding to line card slots in one embodiment), and grant data structure 750 including a bitmap unary representation of the number of grants received for each slot (e.g., from each request generator) is used to maintain the grants. These bitmaps may or may not be right-aligned.

Returning to the processing of FIG. 7A and process block 706, if this is a unicast iteration and a first iteration of the scheduling cycle, then in process block 708, the acceptance advancement position is typically determined in the same manner as that for the grant advancement position as described herein, and the advance flag is cleared.

Next, as determined in process block 710, if this is a multicast iteration, then in process block 712, all grants are accepted (as a sending line card does not send more multicast requests than it can service), acceptance indications are transmitted, and processing returns to process block 704.

Otherwise, in process block 714, up to MAX unicast grants are accepted beginning with the grant at the acceptance advancement position, then grants from the acceptance starting position. In one embodiment, a mechanism for identifying a variable number of items first in sequence from a variable starting position described in relation to at least one of FIGS. 11A-B, 12A-B, 13A-B, 14, 15A-C and/or 16A-C is used to identify which unicast grants are accepted; while in one embodiment, another mechanism is used to identify which unicast grants are accepted.

Next, in process block 716, the corresponding grant arbiters are notified of their accepted grants and whether their GAP grant was accepted. Next, in process block 718, MAX is decreased by the number of accepted grants generated by this acceptance arbiter. If, as determined in process block 720, this is a first iteration of the current scheduling cycle, then as determined in process block 722, if the grant at the acceptance advancement position was accepted, then the advance flag is set in process block 724. As determined in process block 726, if this is a last iteration of the current scheduling cycle, then as determined in process block 728, if the advance flag is set, then in process block 730, the acceptance starting position is advanced to the next position after the acceptance advancement position. Processing then returns to process block 704.

Figure 8:
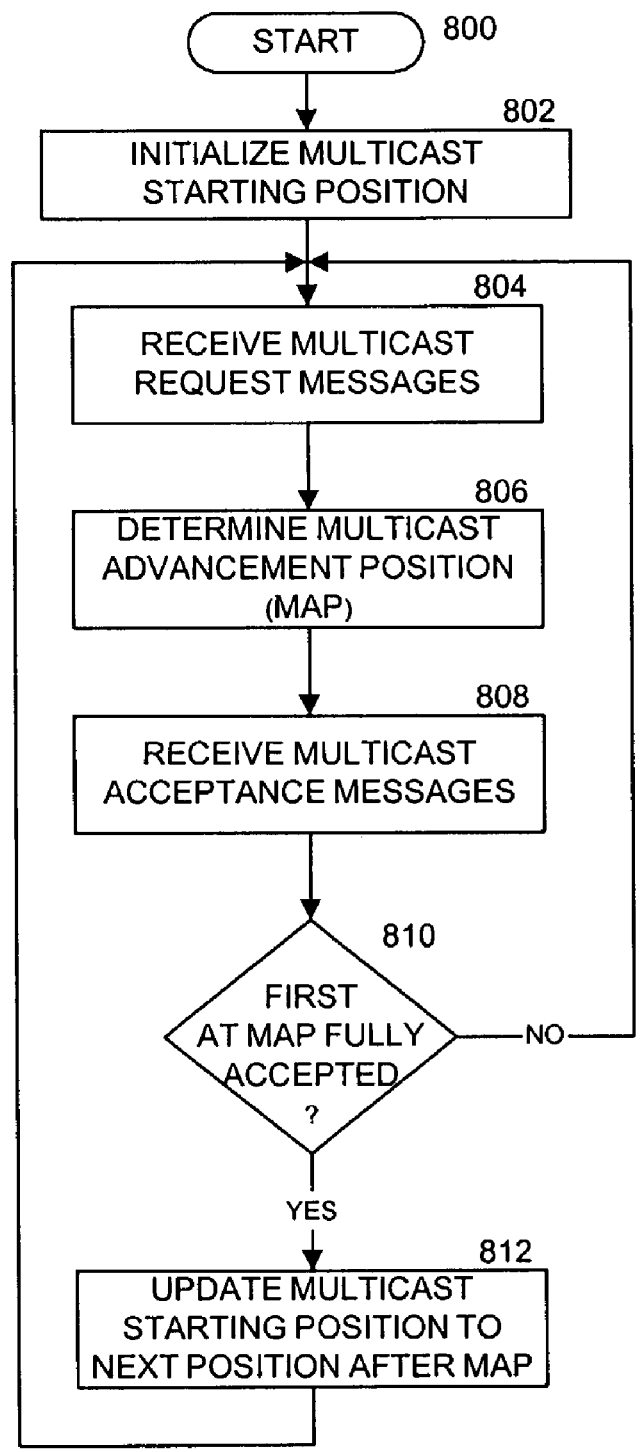
FIG. 8 is a flow diagram of a process used in one embodiment for multicast pointer processing.

FIG. 8 illustrates a process used in one embodiment by a multicast control to update the multicast pointer. Processing begins at process block 800, and proceeds to process block 802, wherein the multicast starting position is initialized. Next, in process block 804, multicast request messages are received from the various request generators. In process block 806, the multicast advancement position is set to the next position having a multicast request at or after the multicast starting position. In process block 808, multicast acceptance indications are received. As determined in process block 810, if all the requests for the multicast packet at the head of the queue corresponding to the multicast starting position were accepted (e.g., the first multicast packet to be sent from the input corresponding to the MAP position was fully accepted), then in process block 812, the multicast starting position is set to the next position after the multicast advancement position. Processing returns to process block 804.

Figure 9:
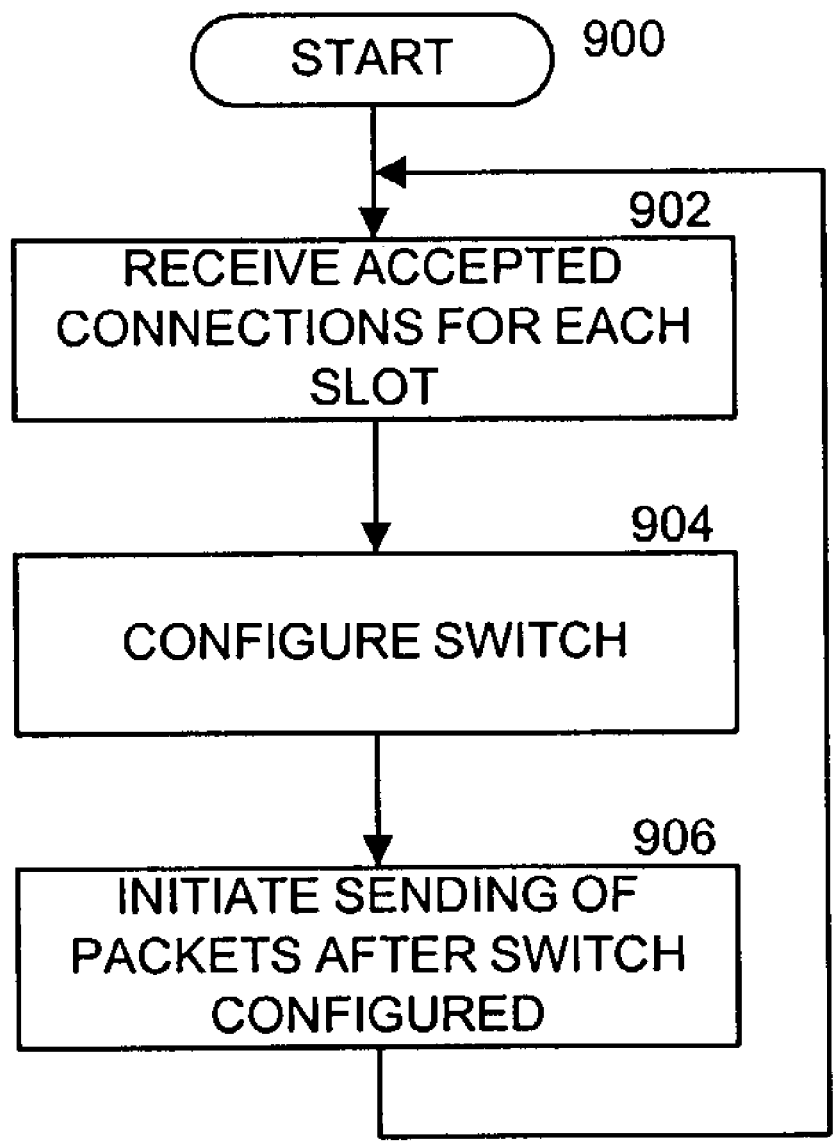
FIG. 9 is a block diagram used in one embodiment for configuring the switch and initiating the sending of packets across the switch.

FIG. 9 illustrates a process used in one embodiment for configuring a switch (e.g., non-blocking switch fabric) and sending of the accepted packets. Processing begins with process block 900, and proceeds to process block 902, wherein indications of the accepted connection are received. In process block 904, the switch is configured at the appropriate time to connect the appropriate input and output ports of the switch corresponding to the accepted requests. Then, in process block 906, sending of the packets are initiated and sent. Processing returns to process block 902.

Figure 10A:
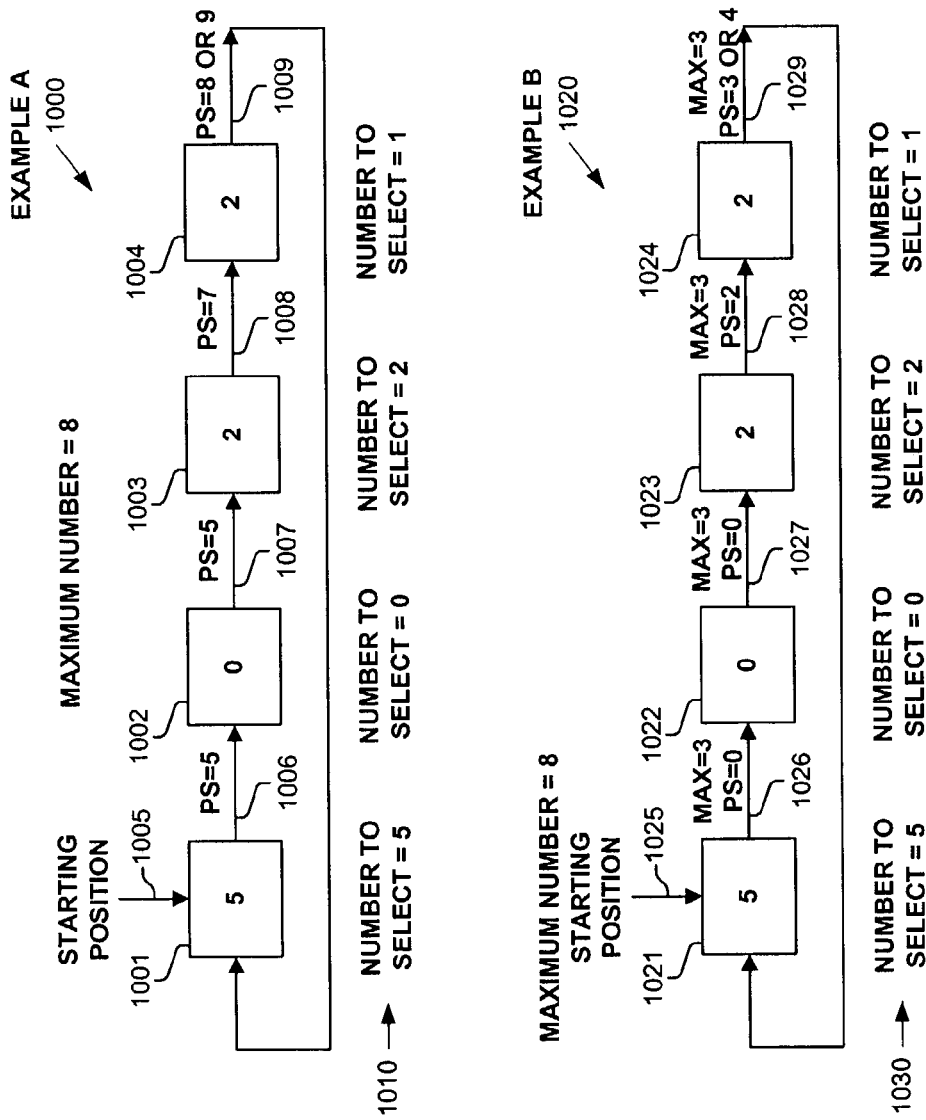
FIGS. 10A-B are a block diagrams illustrating the identification of a variable number of items first in sequence from a variable starting position as performed in some of an unlimited number of embodiments.
Figure 10B:
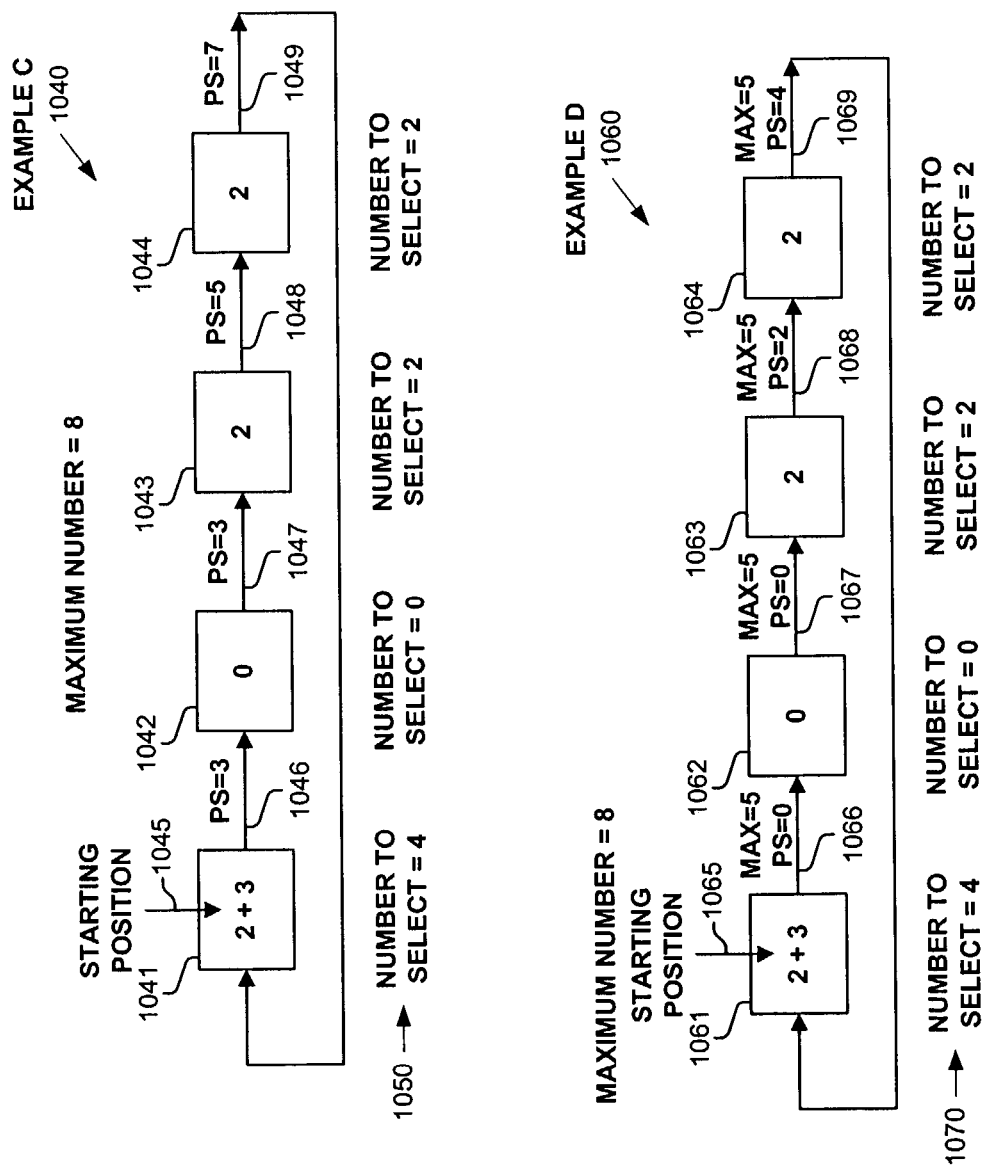

FIGS. 10A-B are block diagrams illustrating mechanisms used in some embodiments for identifying a variable number of items first in sequence from a variable starting position. One embodiment computes a set of progressive sums starting from a starting position pointer or other indication. Depending on the embodiment, the input or output progressive sum at the current starting position is typically treated as zero, while the other groups calculate their respective progressive (e.g., cumulative) sum based on a value received from a group immediately preceding in a predetermined sequence. Based on these values and its desired number of elements to select, a group can determine the number of elements which it can select (i.e., those which fall within the first n or first maximum number of elements beginning with the starting position.) In one embodiment, the starting position indicates a particular group; while in one embodiment, the starting position indicates a particular item within a particular group. In one embodiment, the value of progressive sums is a cumulative value; and in one embodiment, this cumulative value is limited to the maximum number of items of items which can be selected (or some value greater than the maximum number such as that corresponding to the number of bits required to represent the maximum number) as one embodiment does not use the actual value of the progressive sum after it has exceed the maximum value, but rather is concerned whether the progressive sum at least equals the maximum value.

Turning first to FIG. 10A and Example A 1000, illustrated are multiple groups 1001-1004, each having indicated therein the number of desired items (i.e., 5, 0, 2, and 2 respectively), with a maximum number of a total of eight items to be selected. Starting position 1005 indicates group 1001. Although group 1001 receives the progressive sum value of nine (1009), it generates a progressive sum value of five (1006) equal to its desired number of five as group 1001 corresponds to that indicated by starting position indication 1005. Group 1002 generates a progressive sum value of five (1007) as it desires zero items; group 1003 generates a progressive sum value of seven (1008) as it desires two items and it received the progressive sum value of five (1007); and group 1004 generates a progressive sum value of eight or nine (1009) as it desires two items and it received the progressive sum value of seven (1008). In one embodiment, the maximum progressive sum value equals the maximum number of a group, hence eight for group 1004. Based on their received progressive sum values, their generated progressive sum values, and/or their desired number of items, the authorized number of items to select 1010 for groups 1001-1004 are five, zero, two, and one respectively.

Turning next to Example B 1020, illustrated are multiple groups 1021-1024, each having indicated therein the number of desired items (i.e., 5, 0, 2, and 2 respectively), with a maximum number of a total of eight items to be selected. Starting position 1025 indicates group 1021. In this embodiment, the starting group generates a progressive sum value of zero and decreases the maximum number by its desired number. Hence, group 1021 signals group 1022 with a progressive sum value of zero and an updated maximum number of three (1026). Henceforth, each group propagates this same updated maximum number and determines its progressive sum and number of items to select in the same manner as before. In one embodiment, the updated maximum number is distributed directly to each of the groups 1021-1024 rather than being propagated. Group 1022 generates a progressive sum value of zero and maximum number of three (1027) as it desires zero items; group 1023 generates a progressive sum value of two and maximum number of three (1028) as it desires two items and it received the progressive sum value of zero (1027); and group 1024 generates a progressive sum value of three or four and maximum number of three (1029) as it desires two items and it received the progressive sum value of two and a maximum number of three (1028). Based on their received progressive sum values, their generated progressive sum values, and/or their desired number of items, the authorized number of items to select 1030 for groups 1021-1024 are five, zero, two, and one respectively.

Turning next to FIG. 10 B and Example C 1040, illustrated are multiple groups 1041-1044, each having indicated therein the number of desired items (i.e., 5, 0, 2, and 2 respectively), with a maximum number of a total of eight items to be selected. Starting position 1045 indicates group 1041 and a position within group 1041 corresponding to three early desired items from and after the position indicated by starting position 1045 and two late desired items before the position indicated by starting position 1045. Although group 1041 receives the progressive sum value of seven (1049), it generates a progressive sum value of three (1046) equal to its desired number of three items at or after that starting position indication 1045. Group 1042 generates a progressive sum value of three (1047) as it desires zero items; group 1043 generates a progressive sum value of five (1048) as it desires two items and it received the progressive sum value of three (1047); and group 1044 generates a progressive sum value of seven (1049) as it desires two items and it received the progressive sum value of five (1048). Group 1041, as it desires a late desired number of two additional items and the received progressive sum of seven is less than the maximum number of eight, can select an additional eight minus seven or one additional item. Therefore, based on their received progressive sum values, their generated progressive sum values, and/or their desired number of items, the authorized number of items to select 1050 for groups 1041-1044 are four, zero, two, and two respectively.

Turning next to Example D 1060, illustrated are multiple groups 1061-1064, each having indicated therein the number of desired items (i.e., 5, 0, 2, and 2 respectively), with a maximum number of a total of eight items to be selected. Starting position 1065 indicates group 1061 and a position within group 1061 corresponding to three early desired items from and after the position indicated by starting position 1065 and two late desired items before the position indicated by starting position 1065. In this embodiment, group 1061 generates a progressive sum value of zero and updated maximum number of five (1066) equal to the received maximum value of eight minus its early desired number of three items at or after that starting position indication 1065. In one embodiment, the updated maximum number is distributed directly to each of the groups 1061-1064 rather than being propagated. Group 1062 generates a progressive sum value of zero and maximum number of five (1067) as it desires zero items; group 1063 generates a progressive sum value of two and maximum number of five (1068) as it desires two items and it received the progressive sum value of zero and maximum number of five (1067); and group 1064 generates a progressive sum value of four and maximum number of five (1069) as it desires two items and it received the progressive sum value of two and maximum number of five (1068). Group 1061, as it desires a late desired number of two additional items and the received progressive sum of four is less than the received updated maximum number of five, can select an additional five minus four or one additional item. Therefore, based on their received progressive sum values, their generated progressive sum values, and/or their desired number of items, the authorized number of items to select 1070 for groups 1061-1064 are four, zero, two, and two respectively.

Figure 11A:
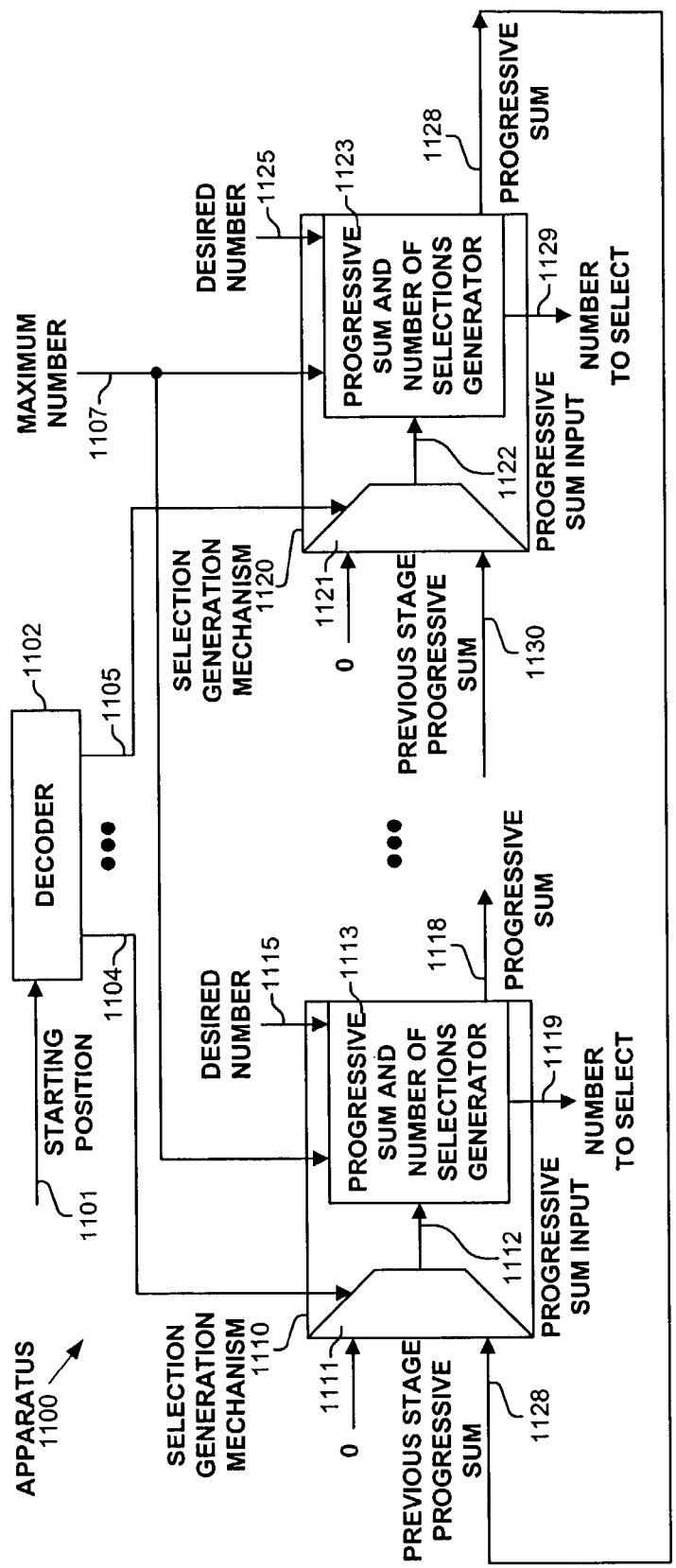
FIG. 11A is a block diagram illustrating a mechanism used in one embodiment to identify a variable number of items first in sequence from a variable starting position.

FIG. 11A is a block diagram illustrating one embodiment for identifying a variable number of items first in sequence from a variable starting position. As shown, apparatus 1100 identifies a number to select (1119, 1129) for each of the selection generation mechanisms (1110, 1120). Based on a starting position indication 1101, decoder 1102 generates signals 1104-1105 indicating to the multiple selection generation mechanisms 1110 and 1120, which is the one corresponding to the starting position. Note, although only two selection generation mechanisms 1110 and 1120 are shown, any number of such selection generation mechanisms can be used in accordance with the invention. For example, one embodiment includes sixteen selection generation mechanisms. The total number of selections to be made across all selection generations mechanisms is communicated to them via maximum number signal 1107.

In one embodiment, selection generation mechanism 1110 includes a multiplexor 1111 (or any other mechanism) for selecting, based on the starting position indication 1104, between the previous stage progressive sum value 1128 and zero to generate progressive sum input 1112. Number of selections generator 1113, based on its desired number 1115 of items to be selected, maximum number 1107, and/or progressive sum input 1112, generates its progressive sum value 1118 and number to select 1119.

Similarly, in one embodiment, selection generation mechanism 1120 includes a multiplexor 1121 (or any other mechanism) for selecting, based on the starting position indication 1105, between the previous stage progressive sum value 1130 and zero to generate progressive sum input 1122. Number of selections generator 1123, based on its desired number 1125 of items to be selected, maximum number 1107, and/or progressive sum input 1122, generates its progressive sum value 1128 and number to select 1129.

In one embodiment, desired numbers 1115 and 1125 correspond to numbers of received requests or grants, such as that described herein, especially in relation to FIGS. 6A and 7A. The processing by one embodiment of selection generation mechanisms 1110 and 1120 is further described in relation to FIG. 11B, to which we now turn.

Figure 11B:
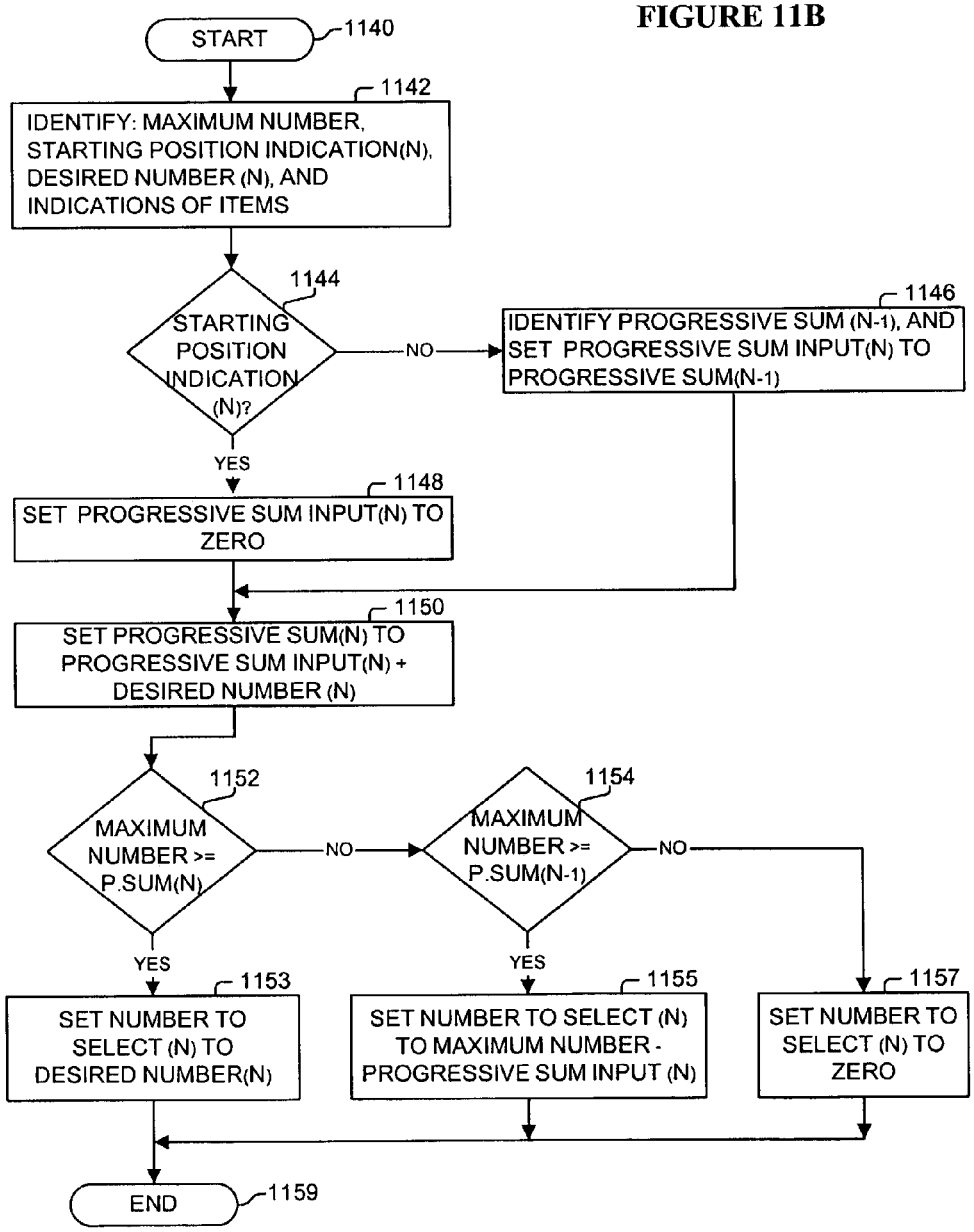
FIG. 11B is a flow diagram illustrating a process used in one embodiment for identifying a variable number of items first in sequence from a variable starting position.

FIG. 11B is a flow diagram illustrating a process used in one embodiment for identifying a variable number of items first in sequence from a variable starting position. Processing begins with process block 1140, and proceeds to process block 1142, wherein the maximum number of items to be selected across all groups/selection generation mechanisms, the starting position indication (N), and the desired number (N) are identified (e.g., received, known a priori, etc.). Note, the notation (N) denotes the current selection generation mechanism, and the notation (N−1) denotes the previous selection generation mechanism in the predetermined sequence of selection generation mechanisms.

Next, as determined in process block 1144, if starting position indication (N) corresponds to the starting position, then in process block 1148, progressive sum input (N) is set to zero; otherwise, in process block 1146, the value of progressive sum (N−1) is identified, and progressive sum input (N) is set to the received progressive sum (N−1). Next, in process block 1150, progressive sum (N) is set to the value of the progressive sum input (N) plus the desired number (N), with the value of progressive sum (N) forwarded to the next selection generation mechanism in the predetermined sequence. In one embodiment, the progressive sum is limited to be no larger than the maximum number at this point.

As determined in process block 1152, if the maximum number is greater than or equal to the value of progressive sum (N), then in process block 1153, the number to select (N) is set to the desired number (N) as all can be selected as the maximum number will not be exceeded in doing so. Otherwise, as determined in process block 1154, if the maximum number is greater than or equal to (or just greater than) progressive sum (N−1), then the maximum number of elements was not already consumed by a previous selection generation mechanism, so a subset of the desired number can be selected, and in process block 1155, the number to select (N) is set to the maximum number minus progressive sum input (N), or in one embodiment, to the maximum number minus progressive sum (N−1). Otherwise, in process block 1157, the number to select (N) is set to zero. Processing is complete as indicated by process block 1159. Note, one embodiment uses different calculations to determine the same number to select (N).

Figure 12A:
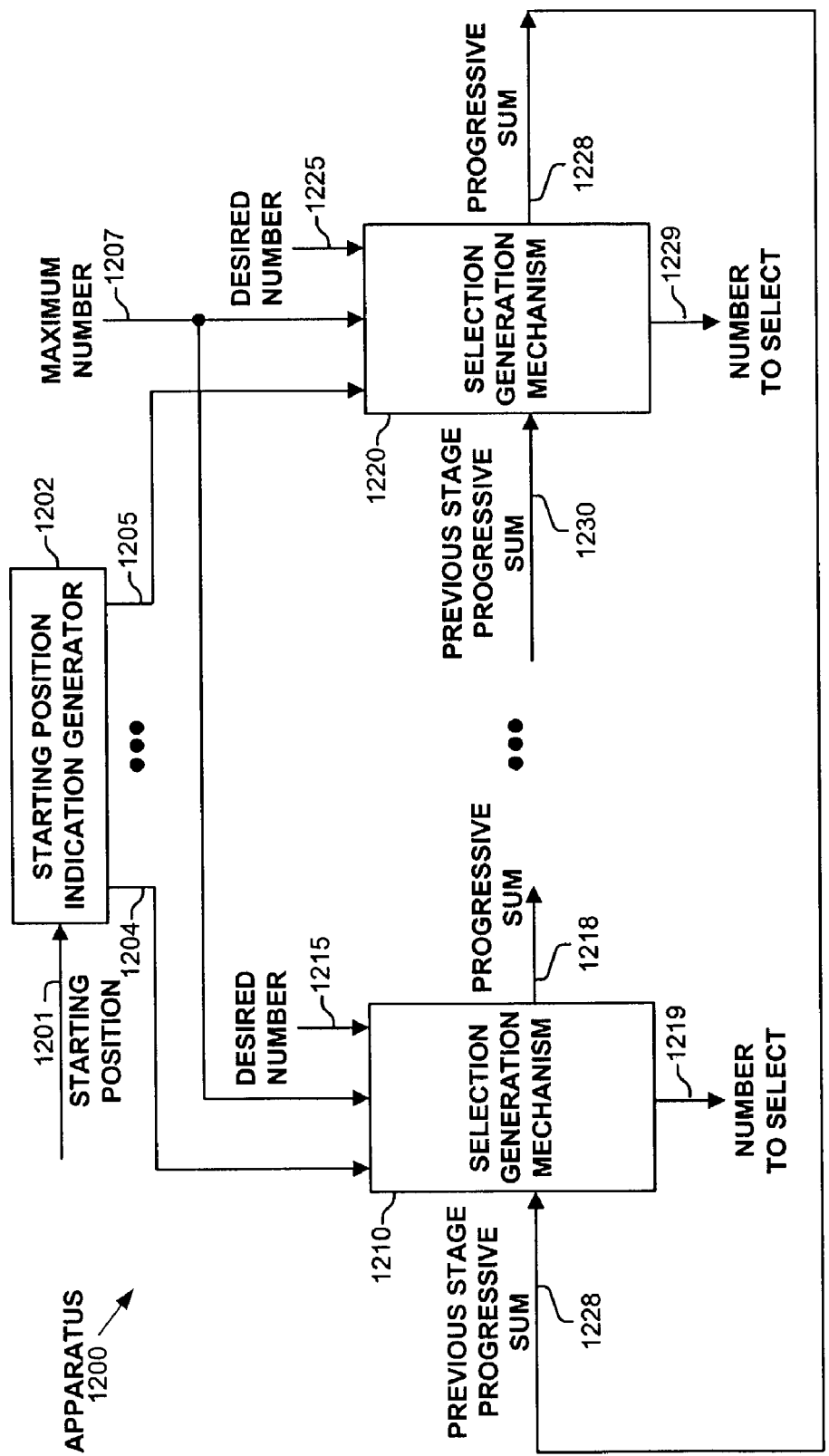
FIG. 12A is a block diagram illustrating a mechanism used in one embodiment to identify a variable number of items first in sequence from a variable starting position which may be within a particular group of items.

FIG. 12A is a block diagram illustrating one embodiment for identifying a variable number of items first in sequence from a variable starting position which may be within a particular group of items. As shown, apparatus 1200 identifies a number to select (1219, 1229) for each of the selection generation mechanisms (1210, 1220). Based on a starting position indication 1201, starting position indication generator 1202 generates signals 1204-1205 indicating to the multiple selection generation mechanisms 1210 and 1220, which is the one corresponding to the starting position and a starting position within the corresponding selection generation mechanism. Note, although only two selection generation mechanisms 1210 and 1220 are shown, any number of such selection generation mechanisms can be used in accordance with the invention. For example, one embodiment includes sixteen selection generation mechanisms. The total number of selections to be made across all selection generations mechanisms is communicated to them via maximum number signal 1207.

In one embodiment, selection generation mechanism 1210 includes a mechanism (e.g., multiplexor or any other mechanism) for identifying, based on the starting position indication 1204, whether to consider the received progressive sum value as zero or previous stage progressive sum 1228. Selection generation mechanism 1210, based on its desired number 1215 of items to be selected, maximum number 1207, starting position 1204, and/or progressive sum input value 1228, generates its progressive sum value 1218 and number to select 1219.

Similarly, in one embodiment, selection generation mechanism 1220 includes a mechanism (e.g., multiplexor or any other mechanism) for identifying, based on the starting position indication 1205, whether to consider the received progressive sum value as zero or previous stage progressive sum 1230. Selection generation mechanism 1220, based on its desired number 1225 of items to be selected, maximum number 1207, starting position 1205, and/or progressive sum input value 1230, generates its progressive sum value 1228 and number to select 1229.

In one embodiment, desired numbers 1215 and 1225 correspond to numbers of received requests or grants, such as that described herein, especially in relation to FIGS. 6A and 7A. The processing by one embodiment of selection generation mechanisms 1210 and 1220 is further described in relation to FIG. 12B, to which we now turn.

Figure 12B:
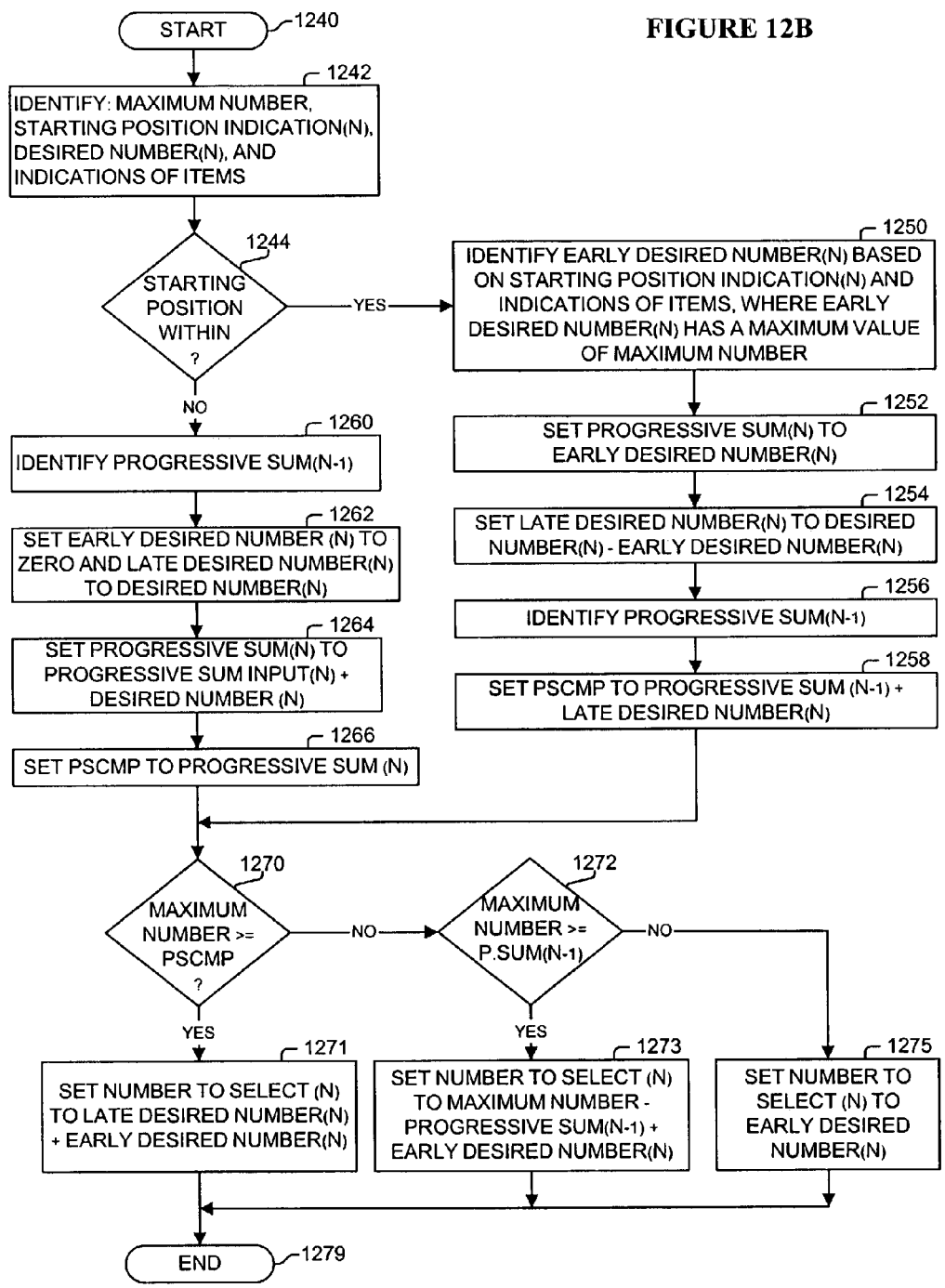
FIG. 12B is a flow diagram illustrating a process used in one embodiment for identifying a variable number of items first in sequence from a variable starting position which may be within a particular group of items.

FIG. 12B is a flow diagram illustrating a process used in one embodiment for identifying a variable number of items first in sequence from a variable starting position which may be within a particular group of items. Processing begins with process block 1240, and proceeds to process block 1242, wherein the maximum number of items to be selected across all groups/selection generation mechanisms, the starting position indication (N), the desired number (N), and the indications of items desiring to be selected are identified (e.g., received, known a priori, etc.).

Next, as determined in process block 1244, if starting position indication (N) corresponds to the starting position within this selection generation mechanism, then in process block 1250, an early desired number (N) is identified based on the starting position indication (N) and indications of items, with early desired number (N) having a maximum value of that of the maximum number. Note, the term early desired number (N) refers to those items desired to be selected whose position is at or after that indicated by starting position indication (N) and the term late desired number (N) refers to the remaining items desired to be selected. The sum of the early and late desired numbers equals the desired number. Also, in one embodiment, the early and late desired numbers are received rather than determined.

Continuing with process block 1252, the progressive sum (N) is set to the value of early desired number (N), with the value of progressive sum (N) forwarded to the next selection generation mechanism in the predetermined sequence. In one embodiment, progressive sum (N) is instead set to zero, and the maximum number sent to all the selection generation mechanisms is decreased by the value of early desired number (N).

In process block 1254, late desired number (N) is determined by subtracting the early desired number (N) from the desired number (N). In process block 1256, the value of progressive sum (N−1) is identified (e.g., received from a previous selection generation mechanism after propagating based on the starting progressive sum generated from this selection generation mechanism.). Next, in process block 1258, the value of a variable PSCMP is set to the progressive sum (N−1) plus the late desired number (N). In one embodiment, this value is selected via hardware or another mechanism instead of using a variable.

Otherwise, in process block 1260, the value of progressive sum (N−1) is received. In process block 1262, early desired number (N) is set to zero and late desired number (N) is set to desired number (N). In process block 1264, progressive sum (N) is set to the value of the progressive sum input (N) plus the desired number (N). In process block 1266, the value of variable PSCMP is set to progressive sum (N).

As determined in process block 1270, if the maximum number is greater than or equal to the value of variable PSCMP, then in process block 1271, the number to select (N) is set to the sum of the early and late desired numbers (i.e., desired number (N)) as all can be selected as the maximum number will not be exceeded in doing so. Otherwise, as determined in process block 1272, if the maximum number is greater than or equal to (or just greater than) progressive sum (N−1), then the maximum number of elements was not already consumed by a previous selection generation mechanism, so a subset of the desired number can be selected, and in process block 1273, the number to select (N) is set to the maximum number minus progressive sum (N−1) plus the early desired number (N). Otherwise, in process block 1275, the number to select (N) is set to early desired number (N). Processing is complete as indicated by process block 1279. Note, one embodiment uses different calculations to determine the same number to select (N).

Figure 13A:
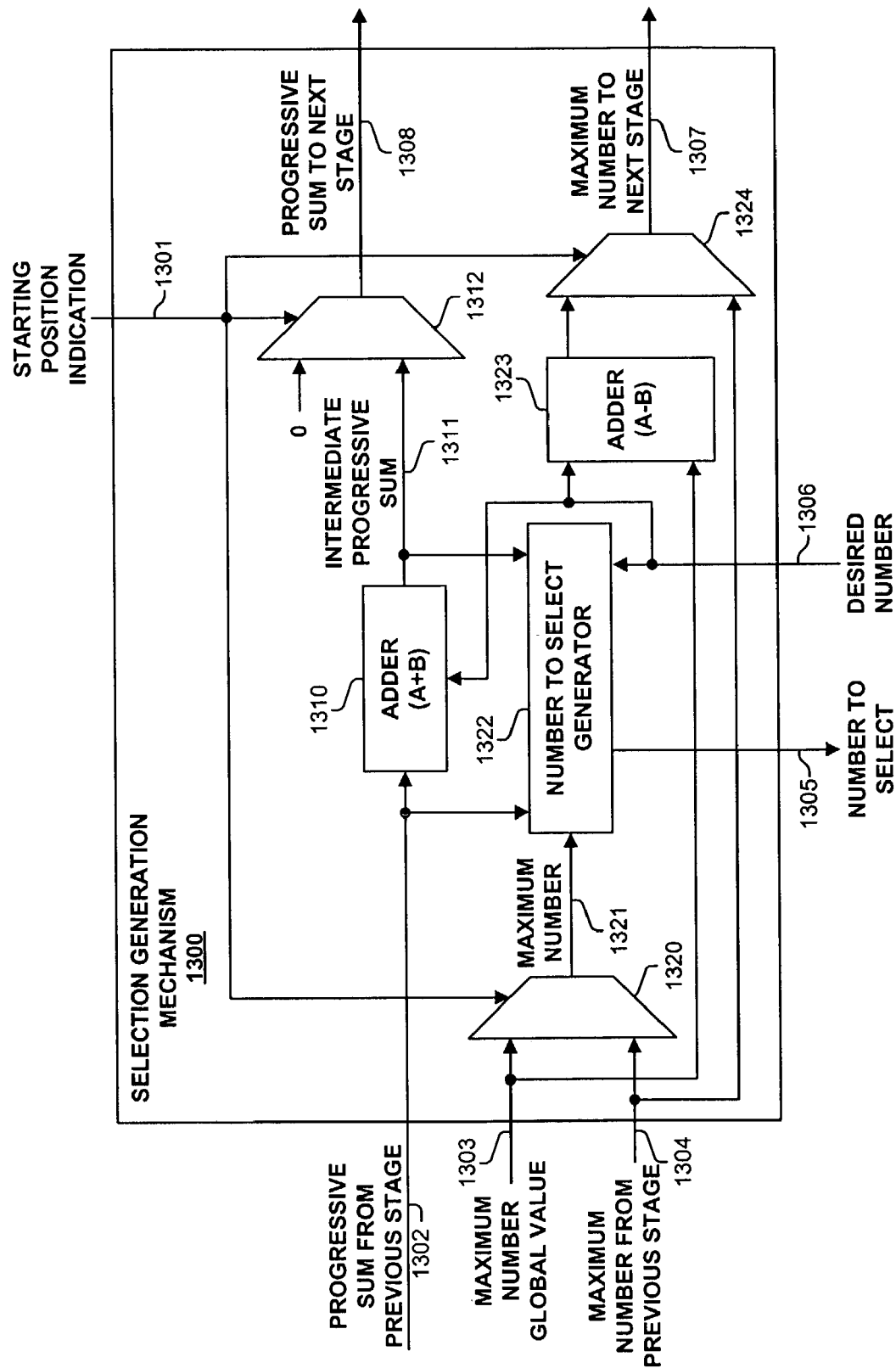
FIG. 13A is a block diagram illustrating a mechanism used in one embodiment to identify a variable number of items first in sequence from a variable starting position.

FIG. 13A is a block diagram illustrating a selection generation mechanism 1300 used in one embodiment to identify a number to select 1305. As shown, selection generation mechanism 1300 receives a progressive sum value 1302 from an immediate previous stage in a predetermined sequence, a maximum number global value 1303, a maximum number from a previous stage 1304, a starting position indication 1301, and a desired number 1306. Note, in one embodiment such as that illustrated in FIG. 14, each selection generation mechanism is provided its appropriate maximum number (rather than two to choose between). Adder 1310 adds to the received progressive sum value 1302 the desired number 1306 to generate the intermediate progressive sum value 1311. Adder 1323 subtracts the desired number 1306 from the received maximum global value 1303. Again, in one embodiment, this is done globally for all selection generation mechanisms.

Selection generation mechanism 1300, based on starting position indication 1301 and using multiplexor 1320, selects to use maximum number global value 1302 if it corresponds to the starting position, otherwise selects to use the updated maximum number 1304 as maximum number 1321. Additionally, based on starting position indication 1301, multiplexor 1312 generates the progressive sum signal 1308 to the next stage by selecting zero when it corresponds to the starting position, else to the intermediate progressive sum value 1311. Also, multiplexor 1324, based on starting position indication 1301, generates the maximum number signal 1307 to the next stage by selecting between the updated maximum number received from a previous stage signal 1304 when it does not corresponds to the starting position, otherwise that generated by adder 1323.

Selection generation mechanism 1300 also determines the number of items to select 1305 for this group of items. In one embodiment, number to select generator 1322 identifies (a) to selected the desired number 1306 if maximum number 1321 is greater than or equal to intermediate progressive sum value 1311; (b) to select the difference between maximum number 1321 and progressive sum value 1302 identified by the immediate previous stage when maximum number 1321 is less than intermediate progressive sum value 1311 and maximum number 1321 is greater than or equal to progressive sum value 1302; or otherwise (c) the value of zero. Note, in one embodiment, selection generation mechanism 1300 processes early and late desired numbers.

Figure 13B:
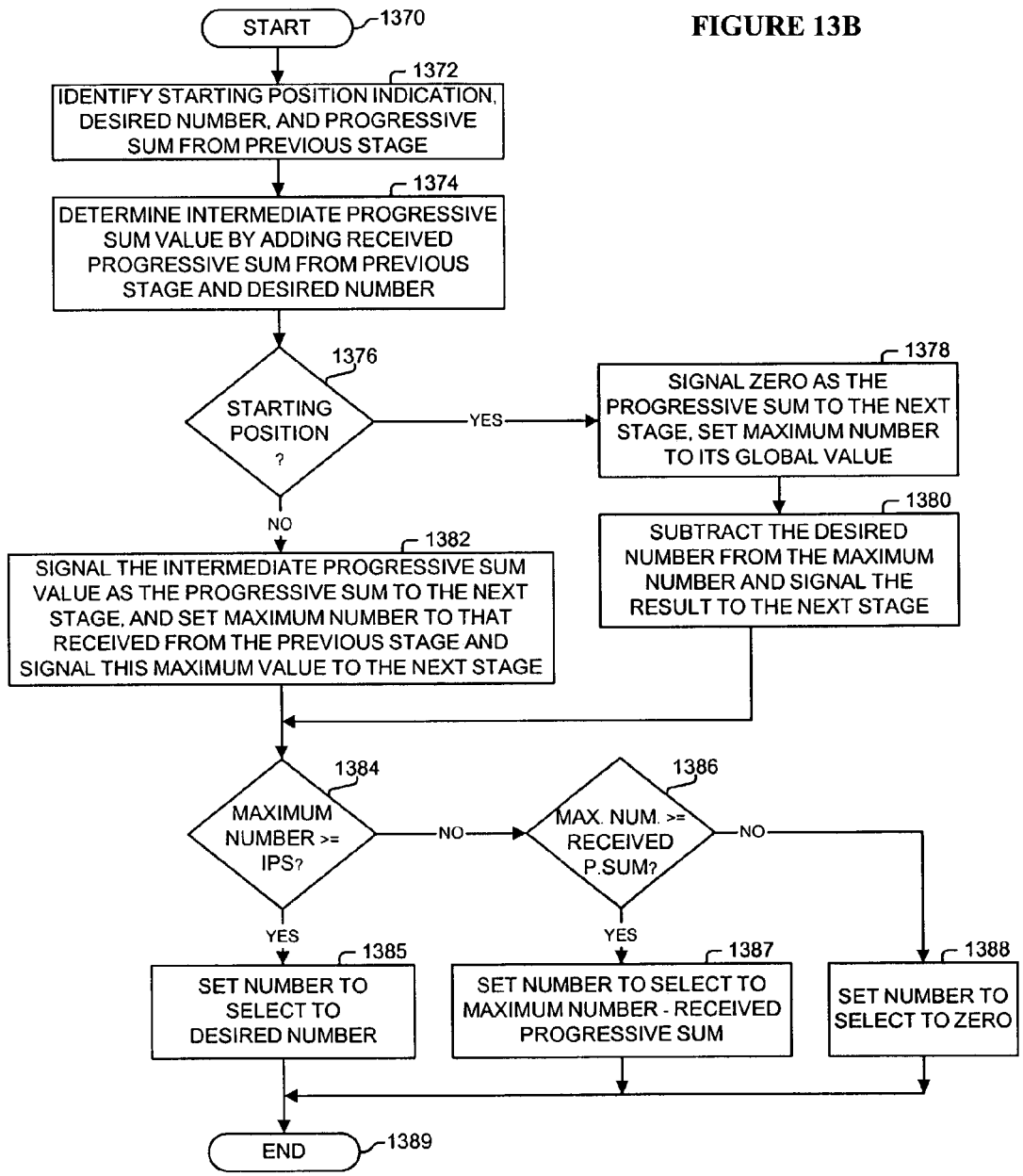
FIG. 13B is a flow diagram illustrating a process used in one embodiment for identifying a variable number of items first in sequence from a variable starting position.

FIG. 13B is a flow diagram illustrating a process used in one embodiment for identifying a variable number of items first in sequence from a variable starting position. Processing begins with process block 1370, and proceeds to process block 1372, wherein a starting position indication, desired number, and progressive sum value corresponding to a previous stage are identified. Next, in process block 1374, an intermediate progressive sum value is determined by adding the previous stage progressive sum value to the desired number.

As determined in process block 1376, if this selection generation mechanism corresponds to the starting position, then in process block 1378, zero is signaled as the progressive sum value to the next selection generation mechanism in the predetermined sequence, and the maximum number is set to the global value. Then, in process block 1380, the desired number is subtracted from the maximum number to produce an updated maximum number to be used by the other selection generation mechanisms. Otherwise, in process block 1382, the intermediate progressive sum value is signaled to the next stage, and the updated maximum number, typically received from a prior stage or other component, is used as the maximum number, and is provided in one embodiment to the next stage in the predetermined sequence.

Now, in one embodiment, the number of items to select for this group is identified in process blocks 1384-1388. As determined in process block 1384, if the maximum number is greater than or equal to the intermediate progressive sum value, then in process block 1385, the number to select is set to the desired number. Otherwise, as determined in process block 1386, if the maximum number is greater than or equal to the progressive sum value corresponding to the previous stage in the predetermined sequence, then in process block 1387, the number to select is set to the maximum number minus the progressive sum value corresponding to the previous stage in the predetermined sequence. Otherwise, in process block 1388, the number to select is set to zero. Processing is complete as indicated by process block 1389.

Figure 14:
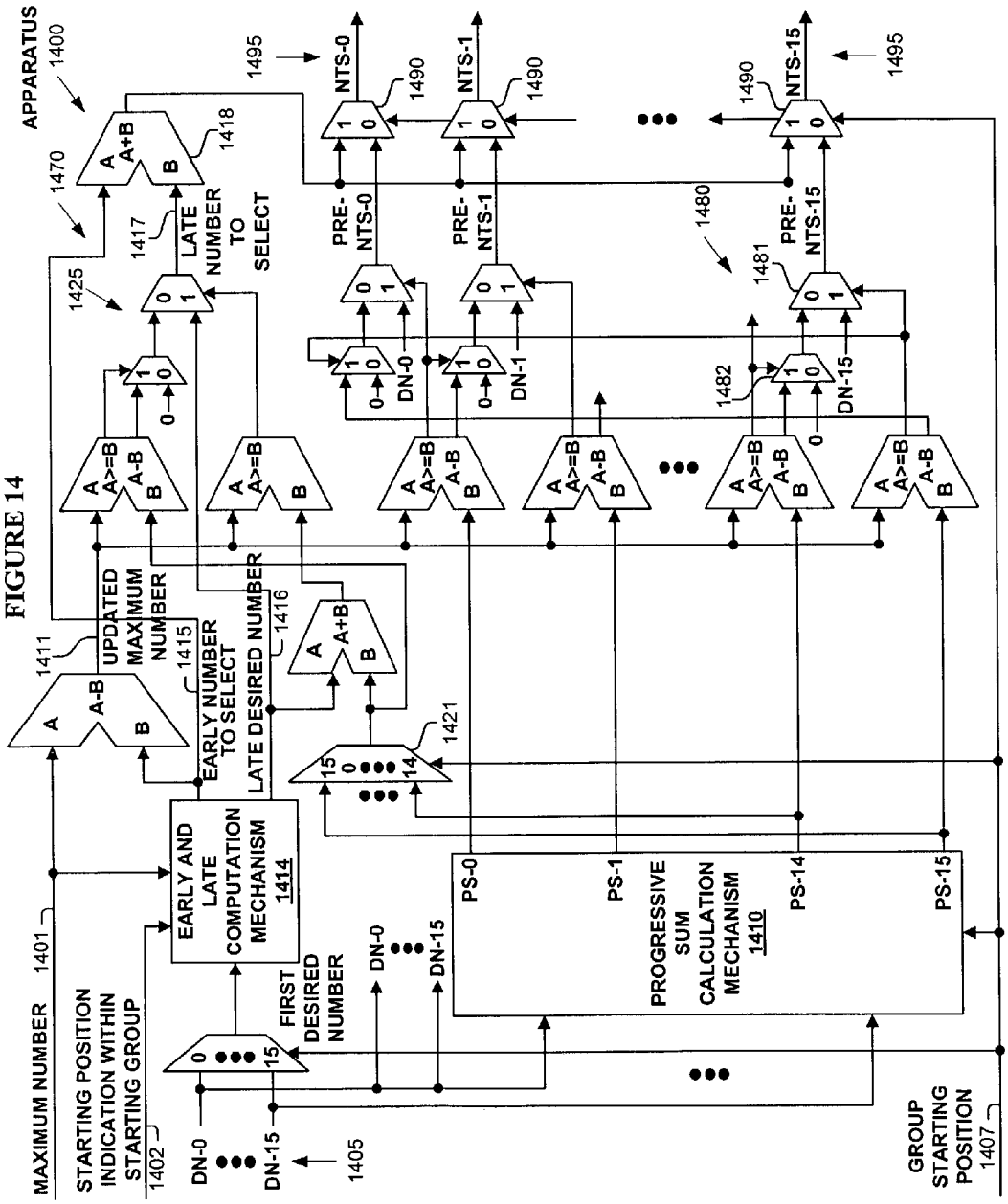
FIG. 14 is a block diagram illustrating a mechanism used in one embodiment to identify a variable number of items first in sequence from a variable starting position.

Note, in one embodiment, the selection generation mechanisms do not compute the correct number to select for the starting position, and other logic may be required to handle the starting position properly, such as, but not limited to that illustrated in FIG. 14.

FIG. 14 is a block diagram illustrating a mechanism or apparatus 1400 used in one embodiment to identify a variable number of items first in sequence from a variable starting position. As shown, apparatus 1400 supports sixteen groups. Of course, other embodiments, support the same number of groups, or more or less groups.

Apparatus 1400 receives maximum number 1401, a starting position within the starting group indication 1402, desired numbers 1405, and a group starting position indication 1407. In general, the top portion of apparatus 1400 is used to support the group identified as the starting group by group starting position indication 1407 and its processing of the early and late desired numbers (1415 and 1416); the lower left portion (i.e., progressive sum calculation mechanism 1410) computes the progressive sums for each of the sixteen groups based on group starting position 1407 and desired numbers 1405; and the lower right portion calculates the numbers to select for each of the sixteen groups, although the final stage of multiplexors 1490 only selects these results for the fifteen non-starting position groups. These numbers to select are determined based on each group's progressive sum value, the progressive sum value of the previous group in the predetermined sequence of groups, and its desired number. In one embodiment, there is no categorization for the first group in terms of early and late desired numbers, and in which case, updated maximum number 1411 is equal to (and typically the same signal as) maximum number 1401.

For example, portion 1480 in the lower-right corner of apparatus 1400, selects/identifies for group fifteen the number to select as (a) the desired number if the updated maximum number 1411 is greater than or equal to the calculated progressive sum value for group fifteen (using multiplexor 1481), (b) the difference between the updated maximum number 1411 and the progressive sum value calculated for group fourteen (the previous group in the predetermined sequence) when updated maximum number 1411 is less than the calculated progressive sum value for group fifteen and the updated maximum number 1411 is greater than or equal to the progressive sum value calculated for group fourteen (using multiplexor 1482), or otherwise (c) zero.

Portion 1470 in the top-half of apparatus 1400 calculates the number of items to select for the group identified as the starting group. This number of items to select equals the sum of the early number to select 1415 (also referred to as the early desired number 1415) and the late number to select 1417, which are summed by adder 1418, and whose resultant value is inserted for the proper starting group by multiplexors 1490. Early and late computation mechanism 1414 identifies the early number to select 1415 and the late desired number 1416 based on the starting position within the starting group indication 1402. Portion 1425 then operates very similar to that previously described in relation to portion 1480, but portion 1425 operates on the late desired number of the group identified as the starting group and multiplexor 1421 selects the progressive sum value of the group immediately prior to the starting group in the predetermined sequence of groups.

In this manner, apparatus 1400 generates the sixteen numbers to select 1495, one number to select for each of the sixteen groups. Additionally, in one embodiment, system 200 (FIG. 2) generates these sixteen numbers to select. Thus, a maximum number of items are determined for each of multiple groups of items identified in a predefined sequence with a variable starting position of the predefined sequence. One embodiment identifies a first group of the multiple groups based on a starting position indication 1407, determines an early desired number 1415 for the first group, generates an updated maximum number 1411 equal to the maximum number 1401 minus the early desired number 1415, identifies a first progressive sum value of zero corresponding to the first group and a previous stage progressive sum value corresponding to the group immediately prior to the first group in the predefined sequence, and determines a late progressive sum value 1417 based on a late desired number 1416 for the first group and the previous stage progressive sum value. The first number of items to select for the first group is determined as being: (a) the early desired number 1415 plus the late desired number 1416 when the updated maximum number 1411 is greater than or equal to the late progressive sum value, (b) the early desired number 1415 plus the updated maximum number 1411 minus the previous stage progressive sum value when the updated maximum number 1411 is less than the late progressive sum value and the updated maximum number 1411 is greater than or equal to the previous stage progressive sum value, or otherwise (c) the early desired number 1415.

One embodiment further identifies the number of items to select for each of the multiple groups except the first group by identifying an immediate previous stage progressive sum value corresponding to the group immediately prior to said particular group in the predefined sequence, determining a progressive sum value for a next group based on the immediate previous stage progressive sum value and a particular desired number for the particular group; and determining a particular number of items to select for the particular group, wherein the particular number of items to select is (a) the particular desired number when the updated maximum number 1411 is greater than or equal to the progressive sum value for the next group, (b) the difference between the updated maximum number 1411 and the immediate previous stage progressive sum value when the updated maximum number 1411 is less than the progressive sum value for the next group and the updated maximum number 1411 is greater than or equal to the immediate previous stage progressive sum value, or otherwise (c) zero.

FIGS. 15A-C and 16A-C illustrate two of an unlimited number of mechanisms for determining the progressive sum values. Note, one embodiment uses a progressive sum calculation mechanism 1410 (FIG. 14) which calculates in parallel the progressive sums for each of the groups, such as, but not limited to using a mechanism illustrated in FIGS. 15A, 15B, 15C, 16A, 16B and/or 16C. Additionally, one embodiment uses a progressive sum calculation mechanism 1410 (FIG. 14) which calculates in series the progressive sums for each of the groups.

Figure 15A:
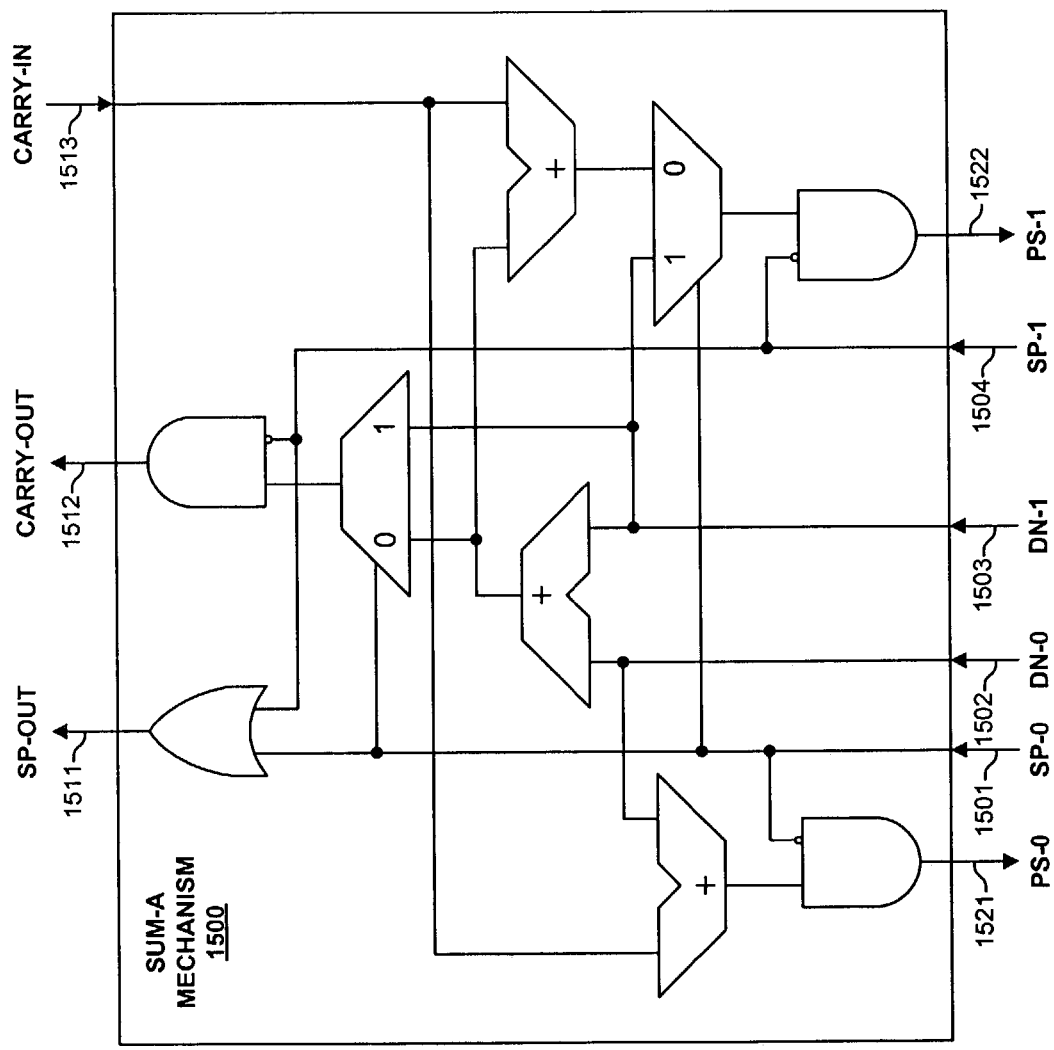
FIGS. 15A-C are block diagrams illustrating a mechanism used in one embodiment to identify progressive sum values from a variable starting position.
Figure 15B:
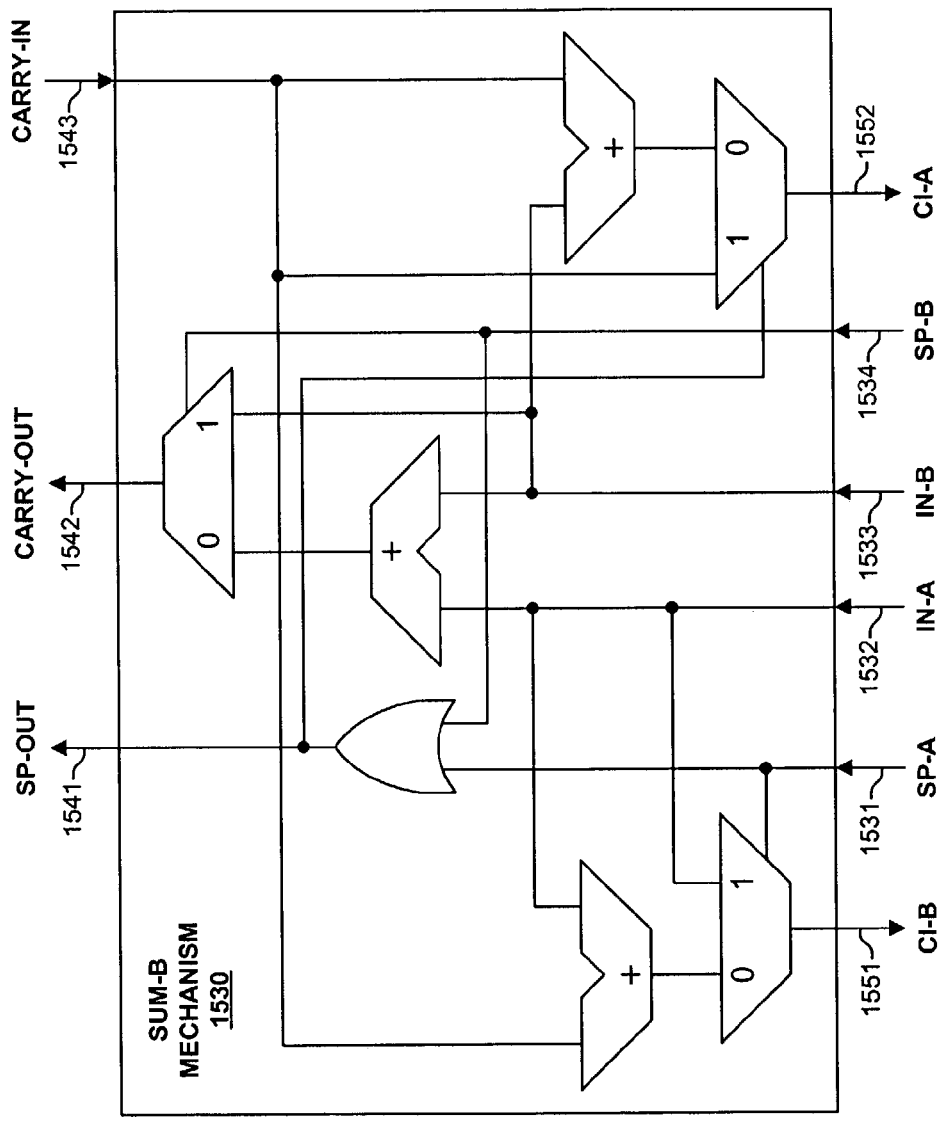
Figure 15C:
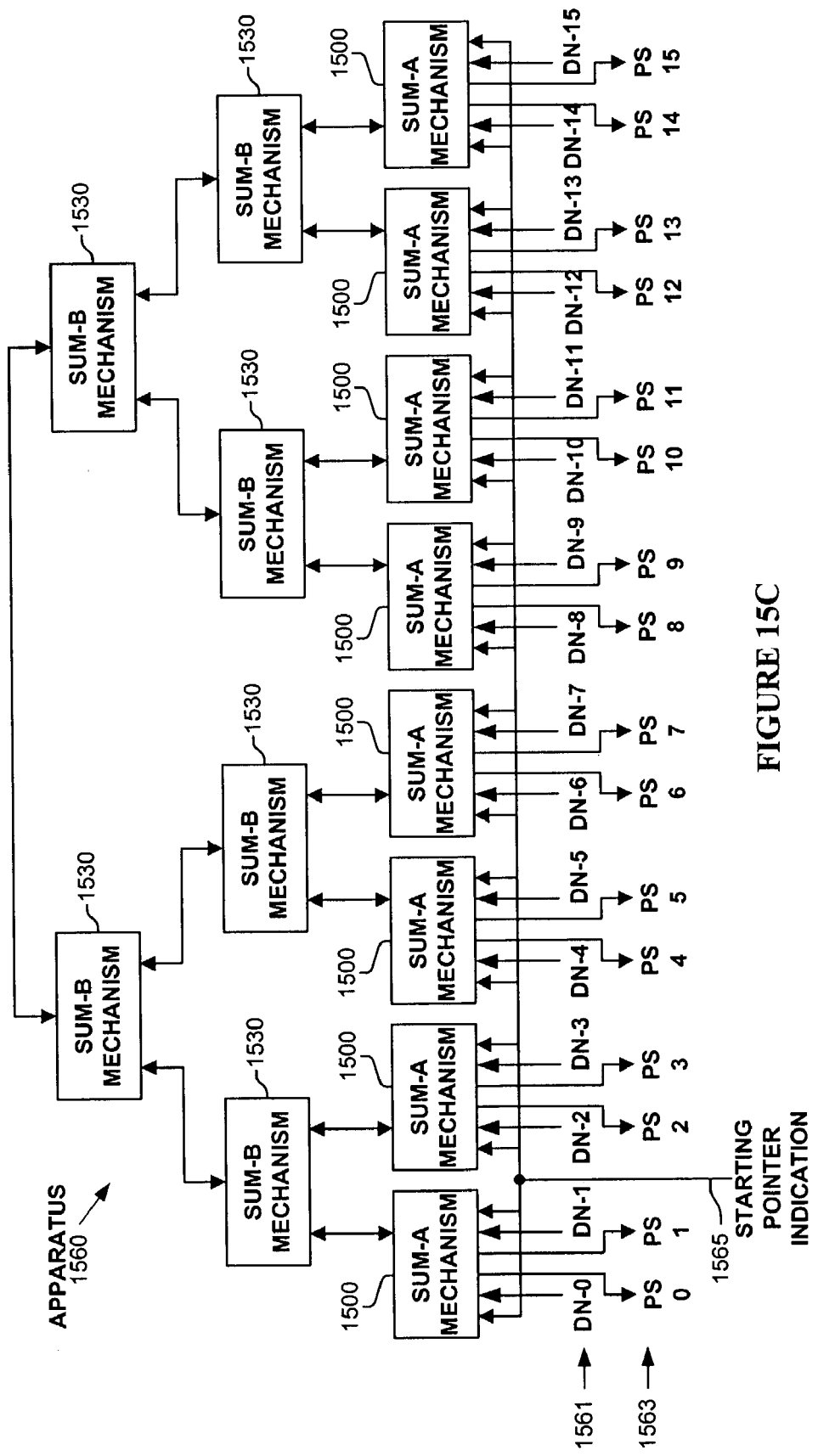

FIGS. 15A-C are block diagrams illustrating a progressive sum calculation mechanism using interconnected bidirectional stages of circuitry for identifying in parallel progressive sum values from a variable starting position. FIG. 15A illustrates a first basic component SUM-A mechanism 1500 and FIG. 15B illustrates a second basic component SUM-B mechanism 1530. Multiple SUM-A mechanisms 1500 and SUM-B mechanisms 1530 may be combined as shown in FIG. 15C to build an apparatus 1560 for identifying the progressive sums for sixteen groups having a variable starting position. Apparatus 1560 is designed with an emphasis of minimizing the number of adders.

SUM-A mechanism 1500 simultaneously operates on two groups of items (e.g., acts as two selection generation mechanisms). SUM-A mechanism 1500 receives as input two desired numbers: DN-0 (1502) and DN-1 (1503), two starting position indications: SP-0 (1501) and SP-1 (1504), and progressive sum carry-in value 1513. Based on these values, SUM-A mechanism 1500 generates two progressive sum signals: PS-0 (1521) and PS-1 (1522). Additionally, SUM-A mechanism 1500 generates a starting pointer indication SP-OUT (1511) and a progressive sum carry-out value (1512) for use for by other components as illustrated by FIG. 15C. As shown, progressive sum carry-out value 1512 is set to (a) DN-1, (b) zero, or (c) the sum of DN-0 plus DN-1.

SUM-B mechanism 1530 communicates with two SUM-A mechanisms 1500 (e.g., denoted "-A" and "-B") as shown in FIG. 15C. SUM-B mechanism 1530 receives as input starting position indications SP-A (1531) and SP-B (1534), progressive sum carry-in values IN-A (1532) and IN-B (1533), and progressive sum carry-in value 1543. SUM-B mechanism 1530 generates starting position signal SP-OUT (1541), progressive sum carry-out 1542, and progressive sum carry-in signals CI-B (1551) and CI-A (1552).

FIG. 15C illustrates a configuration for supporting sixteen non-overlapping groups of items using eight SUM-A mechanisms 1500 and six SUM-B mechanisms 1530, and interconnected as shown in FIG. 15C. Apparatus 1560 receives as input starting pointer indications 1565, and sixteen desired numbers 1561, and produces sixteen progressive sum values (PS-0 to PS-15) 1563. In one embodiment, apparatus 1560 requires (3*N−6) adders and the number of adders in the delay path equals (2*Log 2(N)−2), where N represents the number of non-overlapping groups supported (e.g., the quantity of desired number inputs.)

Figure 16A:
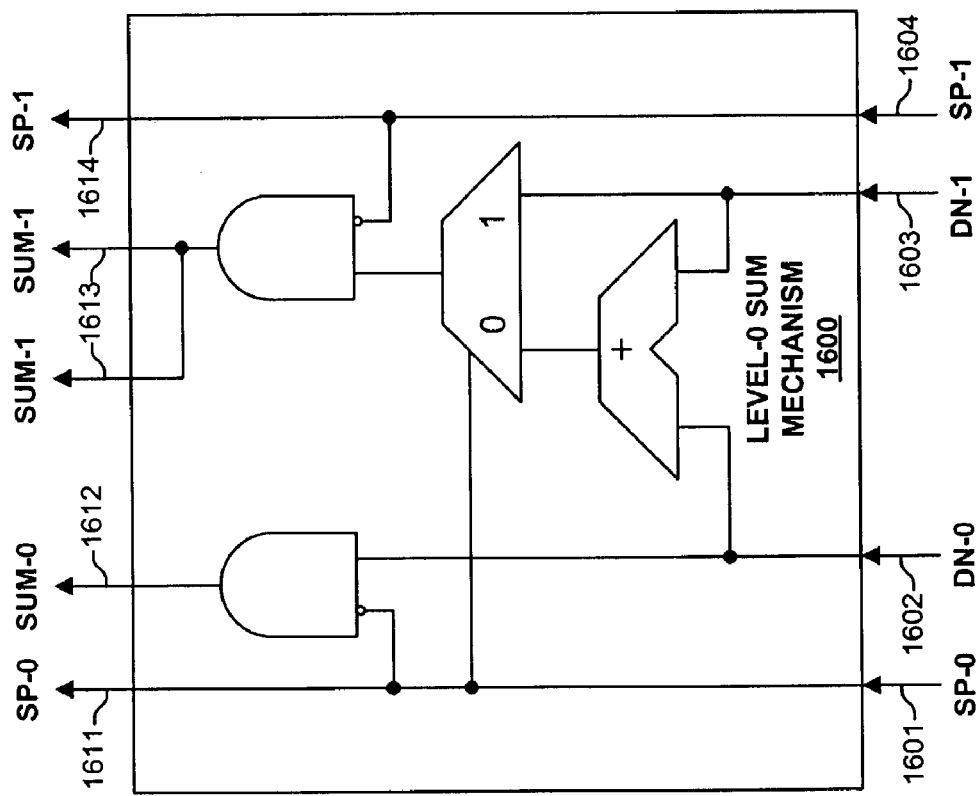
FIGS. 16A-C are block diagrams illustrating a mechanism used in one embodiment to identify progressive sum values from a variable starting position.
Figure 16B:
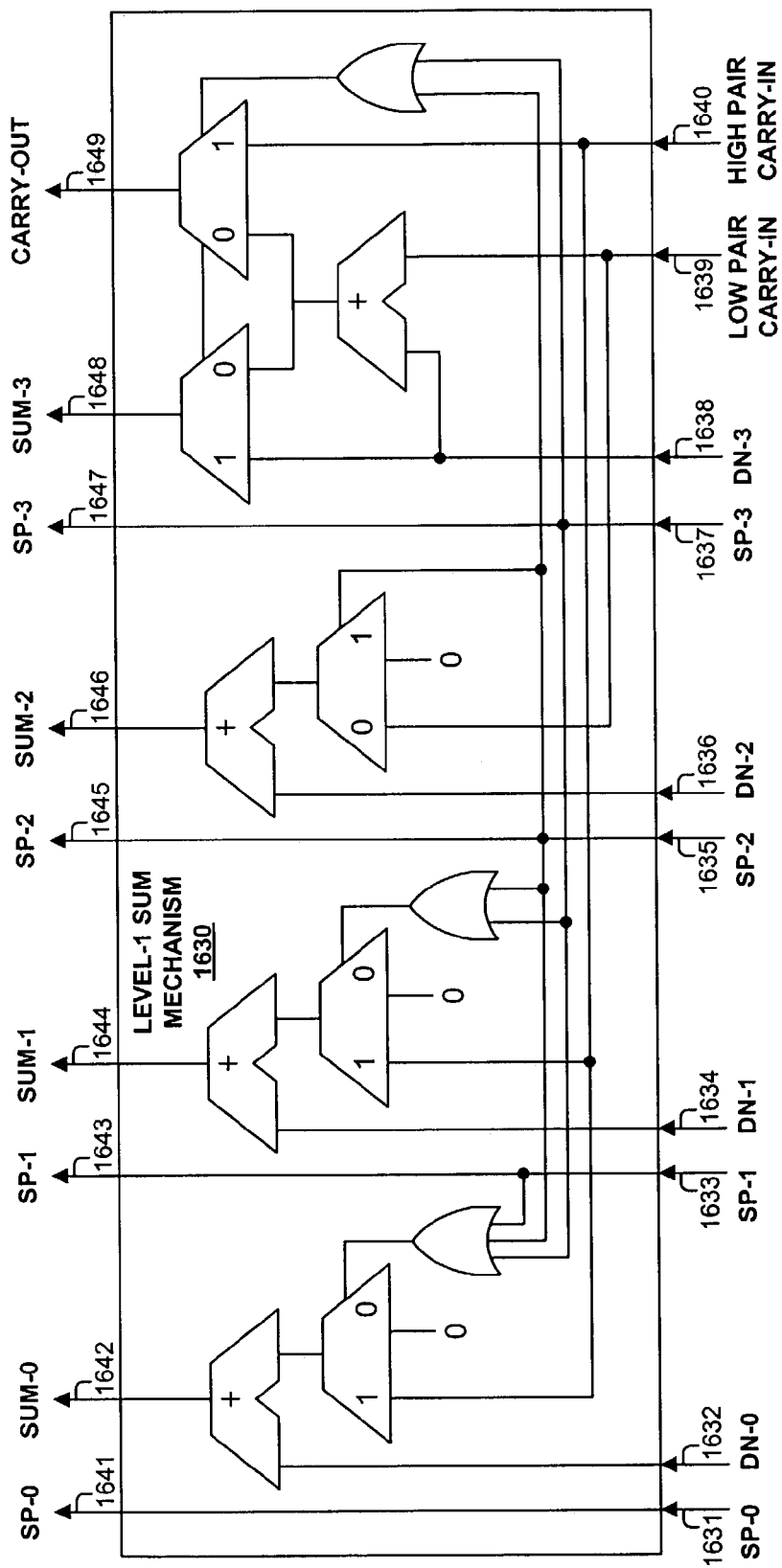
Figure 16C:
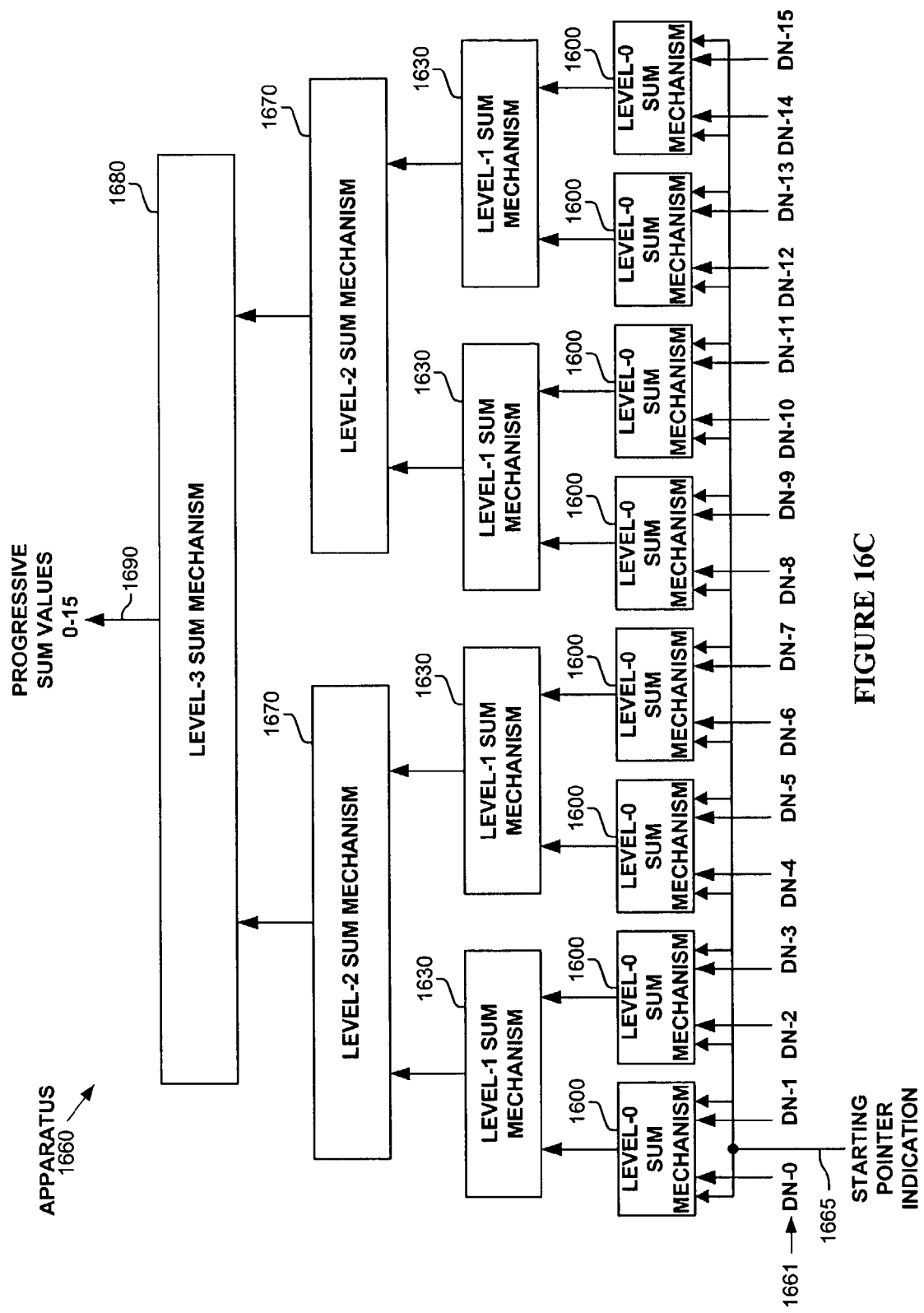

FIGS. 16A-C are block diagrams illustrating a progressive sum calculation mechanism using interconnected bidirectional stages of circuitry for identifying in parallel progressive sum values from a variable starting position. FIG. 16A illustrates a first basic component LEVEL-0 SUM mechanism 1600 and FIG. 16B illustrates a second basic component LEVEL-1 SUM mechanism 1630. Multiple LEVEL-0 SUM mechanisms 1600 and LEVEL-1 SUM mechanisms 1630 may be combined along with other similar components as shown in FIG. 16C to build an apparatus 1660 for identifying a variable number of items first in sequence from a variable starting position. Apparatus 1660 is designed with an emphasis of minimizing total delay in producing the sixteen progressive sum value signals 1690. Each stage consolidates two prior stages.

LEVEL-0 SUM mechanism 1600 simultaneously operates on two groups of items (e.g., acts as two selection generation mechanisms). LEVEL-0 SUM mechanism 1600 receives as input two desired numbers: DN-0 (1602) and DN-1 (1603), and two starting position indications: SP-0 (1601) and SP-1 (1604). Based on these values, LEVEL-0 SUM mechanism 1600 generates two starting position signals SP-0 (1611) and SP-1 (1614), and progressive sums SUM-0 (1612) and SUM-1 (1613). As shown, SUM-0 (1612) is set to either the value of DN-0 or zero, and SUM-1 is set to zero, DN-1, or the sum of DN-0 plus DN-1.

LEVEL-1 SUM mechanism 1630 accepts as input the output values of two LEVEL-0 SUM mechanisms 1600. These input values are SP-0 (1631), SP-1 (1633), SP-2 (1635), SP-3 (1637), DN-0 (1632), DN-1 (1634), DN-2 (1636), DN-3 (1638), as well as the two progressive sum carry-in values low-pair carry-in (1639) and high pair carry-in (1640). LEVEL-1 SUM mechanism 1630 produces SP-0 (1641), SP-1 (1643), SP-2 (1645), SP-3 (1647), and progressive sum values SUM-0 (1642), SUM-1 (1644), SUM-2 (1646), SUM-3 (1648), and CARRY-OUT 1649.

FIG. 16C illustrates a configuration for supporting sixteen non-overlapping groups of items using eight LEVEL-0 SUM mechanisms 1600, and four LEVEL-1 SUM mechanisms 1630, two LEVEL-2 SUM mechanisms 1670, and one LEVEL-3 SUM mechanisms 1680. Note, in one embodiment, LEVEL-2 SUM mechanisms 1670 and one LEVEL-3 SUM mechanisms 1680 are implemented as an obvious and natural expansion of a LEVEL-1 SUM mechanism 1630. Apparatus 1660 receives as input starting pointer indications 1665, and sixteen desired numbers 1661, and produces indications of sixteen progressive sum values 1690. In apparatus 1660, the progressive sums traverse up the tree and only traverse it once, which may make it faster than other embodiments. However, this approach may require more adders than other embodiments. In one embodiment, apparatus 1660 requires (N*Log 2(N)−(N/2)) adders, and the number of adders in the delay path equals Log 2(N).

In one embodiment, apparatus 1560 and apparatus 1660 may be combined using apparatus 1560 for the lower part of the structure (receiving the input desired numbers), and using apparatus 1660 for the upper part of the structure. This trades off more adders than apparatus 1560 alone (but many fewer than apparatus 1660 alone), in exchange for fewer adders in the delay path than apparatus 1560 alone (and only slightly more than apparatus 1660 alone).

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for identifying numbers of items in a packet scheduler to select for each of a plurality of groups of items, the apparatus comprising:

means for determining a progressive sum for each of the plurality of groups of items in the packet scheduler, wherein a first progressive sum corresponds to a first group of the plurality of groups of items and a second progressive sum corresponds to a second group of the plurality of groups of items, wherein the first progressive sum is determined based on a first desired number for the first group and the second progressive sum; and means for determining a number of items to select for each of the plurality of groups of items, wherein a first number of items to select corresponding to the first group is determined based on the second progressive sum.

2. The apparatus of claim 1, wherein a first maximum number is associated with the first group; wherein the first number of items to select is determined based on the second progressive sum, the first maximum number, and the first desired number.

3. The apparatus of claim 2, wherein the first number of items to select is determined based on the first progressive sum, the second progressive sum, the first maximum number, and the first desired number.

4. The apparatus of claim 2, wherein a second maximum number is associated with the second group; wherein the second maximum number is different than the first maximum number.

5. The apparatus of claim 4, wherein the second maximum number is greater than the first maximum number.

6. The apparatus of claim 4, wherein the second group is identified as a starting group in a series of groups including the plurality of groups of items.

7. The apparatus of claim 6, wherein the second progressive sum is zero, the second group has associated therewith a second desired number, and the difference between the first and second maximum numbers is the second desired number.

8. The apparatus of claim 6, wherein the second progressive sum is zero, the second group has associated therewith a second desired number including an early number and a late number, the difference between the first and second maximum numbers is the early number.

9. The apparatus of claim 8, wherein the late number has a value of at least one.

10. The apparatus of claim 8, wherein a second number of items to select is associated with the second group; wherein the second number of items is at least as great as the early number and is not greater than the second desired number.

11. The apparatus of claim 1, wherein said means for determining a progressive sum for each of the plurality of groups of items determines the progressive sum for each of the plurality of groups of items in parallel.

12. A method for identifying numbers of items in a packet scheduler to select for one or more groups of a plurality of groups of items identified in a predefined sequence with a variable starting position of the predefined sequence, the sum of said number of items to select equal to a maximum number, the method comprising:
  identifying a first group of the plurality of groups in the packet scheduler based on a starting position indication;
  determining an early desired number for the first group;
  generating an updated maximum value equal to the maximum number minus the early desired number;
  identifying a first progressive sum value, corresponding to the first group, to be zero;
  identifying a previous stage progressive sum value corresponding to the group immediately prior to the first group in the predefined sequence;
  determining a late progressive sum value based on a late desired number for the first group and the previous stage progressive sum value; and
  determining a first number of items to select for the first group based on the late progressive sum value or the early desired number.

13. The method of claim 12, wherein the first number of items to select is (a) the early desired number plus the late desired number when the updated maximum number is greater than or equal to the late progressive sum value, (b) the early desired number plus the updated maximum value minus the previous stage progressive sum value when the updated maximum number is less than the late progressive sum value and the updated maximum number is greater than or equal to the previous stage progressive sum value, or otherwise (c) the early desired number.

14. The method of claim 12, further comprising:
  for each particular group of the plurality of groups except the first group:
    identifying an immediate previous stage progressive sum value corresponding to the group immediately prior to said particular group in the predefined sequence;
    determining a progressive sum value for a next group based on the immediate previous stage progressive sum value and a particular desired number for the particular group; and
    determining a particular number of items to select for the particular group.

15. The method of claim 14, wherein the particular number of items to select is (a) the particular desired number when the updated maximum value is greater than or equal to the progressive sum value for the next group, (b) the difference between the updated maximum value and the immediate previous stage progressive sum value when the updated maximum value is less than the progressive sum value for the next group and the updated maximum value is greater than or equal to the immediate previous stage progressive sum value, or otherwise (c) zero.

16. A method for identifying numbers of items in the packet scheduler to select for each of a plurality of groups of items identified in a predefined sequence with a variable starting position of the predefined sequence, the sum of said number of items to select equal to a maximum number, the method comprising:
  identifying a first group of the plurality of groups in the packet scheduler based on a starting position indication;
  identifying a first desired number for the first group;
  generating an updated maximum value equal to the maximum number minus the first desired number;
  identifying a first progressive sum value, corresponding to the first group, to be zero;
  determining the first number of items to select based on the first desired number; and
  for each particular group of the plurality of groups except the first group:
    identifying an immediate previous stage progressive sum value corresponding to the group immediately prior to said particular group in the predefined sequence;
    determining a progressive sum value for a next group based on the immediate previous stage progressive sum value and a particular desired number for the particular group; and
    determining a particular number of items to select for the particular group based on the progressive sum value for the next group.

17. The method of claim 16, wherein the particular number of items to select is (a) the particular desired number when the updated maximum value is greater than or equal to the progressive sum value for the next group, or (b) the difference between the updated maximum value and the immediate previous stage progressive sum value when the updated maximum value is less than the progressive sum value for the next group and the updated maximum value is greater than or equal to the immediate previous stage progressive sum value, or otherwise (c) zero.

18. An apparatus for identifying numbers of items in the packet scheduler to select for each of a plurality of groups of items identified in a predefined sequence with a variable starting position of the predefined sequence, the sum of said number of items to select equal to a maximum number, the apparatus comprising:
  means for determining a progressive sum value for each of the plurality of groups of items in the packet scheduler, a particular progressive sum value for a particular group of the plurality of groups of items being determined based on a desired number for the particular group when the particular group is identified as the first group and based on a received progressive sum value corresponding to an immediately preceding group of the plurality of groups of items and on the desired number when the particular group is not identified as the first group; and
  means for determining a number of items to select for each of the plurality of groups of items based on its respective said progressive sum value.

19. The apparatus of claim 18, wherein the particular progressive sum value is equal to the desired number when the particular group is identified as the first group.

20. The apparatus of claim 18, wherein the particular progressive sum value is equal to a minimum of the desired number and the maximum number when the particular group is identified as the first group.

21. The apparatus of claim 18, wherein the particular progressive sum value is equal to the desired number plus the received progressive sum value when the particular group is not identified as the first group.

22. The apparatus of claim 18, wherein the particular progressive sum value is equal to a minimum of the desired number plus the received progressive sum value and the maximum number when the particular group is not identified as the first group.

23. The apparatus of claim 18, wherein said means for determining a progressive sum value includes means for determining an early number of the desired number based on a starting position indication; and wherein the particular progressive sum value is equal to the early number when the particular group is identified as the first group.

24. The apparatus of claim 18, wherein said means for determining a progressive sum value includes means for determining an early number of the desired number based on a starting position indication; and wherein the particular progressive sum value is equal to a minimum of the early number and the maximum number when the particular group is identified as the first group.

25. A method used in identifying numbers of items in the packet scheduler to select for each of a plurality of groups of items identified in a predefined sequence with a variable starting position of the predefined sequence, the method comprising:
identifying a starting position indication; and
identifying a desired number of items for each of the plurality of groups of items based in the packet scheduler on a respective progressive sum for each particular group of the plurality of groups of items determined based on the starting position indication, the desired number of items associated with a particular group, and a generated progressive sum of an immediately preceding group to that of said particular group in the predefined sequence.

26. The method of claim 25, wherein said determining the progressive sum for each particular group of the plurality of groups of items includes determining in parallel the progressive sum for each particular group of the plurality of groups of items.

27. The method of claim 25, further comprising determining a number of items to select for each particular group of the plurality of groups of items based on the desired number of items associated with said particular group, the generated progressive sum of the immediately preceding group to that of said particular group in the predefined sequence, and the progressive sum of said particular group.

28. An apparatus for identifying numbers of items in the packet scheduler to select for each of a plurality of groups of items identified in a predefined sequence with a variable starting position of the predefined sequence, the apparatus comprising:
a progressive sum calculation mechanism for calculating in parallel a progressive sum for each particular group of the plurality of groups of items in the packet scheduler based on a starting position indication and the desired number of items associated with a particular group; and
circuitry for generating a number of items to select for each particular group of the plurality of groups of items based on the desired number of items associated with said particular group, a generated progressive sum of the immediately preceding group to that of said particular group in the predefined sequence, and the progressive sum of said particular group.

29. The apparatus of claim 28, wherein said circuitry for generating the number of items to select for each particular group of the plurality of groups of items includes a selection mechanism for selecting, based on a result of a comparison operation of a maximum value and the progressive sum of said particular group, between the desired number of items associated with said particular group and a second number.

30. The apparatus of claim 29, wherein said circuitry for generating the number of items to select for each particular group of the plurality of groups of items includes a selection mechanism for generating the second number by selecting, based on a result of a comparison operation of the maximum value and the generated progressive sum of the immediately preceding group, between (a) zero and (b) the maximum value minus the generated progressive sum of the immediately preceding group.

31. The apparatus of claim 30, wherein said circuitry for generating the number of items to select for each particular group of the plurality of groups of items includes:
a mechanism for determining the maximum value based on an identified maximum number and an early value of a starting group of the plurality of groups of items, wherein the starting group is identified by the starting position indication; and
a mechanism for determining a late value corresponding to the starting group;
a mechanism for adding the early value and the late value to generate a starting group number to select; and
a selection mechanism for selecting the starting group number for the starting group based on the starting position indication.

32. The apparatus of claim 28, wherein said circuitry for generating the number of items to select for each particular group of the plurality of groups of items includes:
a mechanism for determining the maximum value based on an identified maximum number and an early value of a starting group of the plurality of groups of items, wherein the starting group is identified by the starting position indication; and
a mechanism for determining a late value corresponding to the starting group;
a mechanism for adding the early value and the late value to generate a starting group number to select; and
a selection mechanism for selecting the starting group number for the starting group based on the starting position indication.

* * * * *

UNITED STATES PATENT AND TRADEMARK OFFICE
CERTIFICATE OF CORRECTION

PATENT NO.        : 7,408,937 B1                                    Page 1 of 1
APPLICATION NO.   : 10/338985
DATED             : August 5, 2008
INVENTOR(S)       : Cohen et al.

It is certified that error appears in the above-identified patent and that said Letters Patent is hereby corrected as shown below:

Col. 24, line 11, replace "items in the" with -- items in a --

Col. 24, line 49, replace "items in the" with -- items in a --

Col. 25, line 30, replace "items in the" with -- items in a --

Col. 25, line 37, replace "based in the packet scheduler" with -- in the packet scheduler based --

Col. 25, line 56, replace "items in the" with -- items in a --

Signed and Sealed this

Second Day of February, 2010

David J. Kappos
*Director of the United States Patent and Trademark Office*